(12) United States Patent
Ochi et al.

(10) Patent No.: US 7,275,161 B2
(45) Date of Patent: Sep. 25, 2007

(54) METHOD, SYSTEM, DEVICE AND COMPUTER PROGRAM FOR MUTUAL AUTHENTICATION AND CONTENT PROTECTION

(75) Inventors: Makoto Ochi, Hirakata (JP); Shinji Inoue, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 736 days.

(21) Appl. No.: 10/493,545

(22) PCT Filed: Oct. 29, 2002

(86) PCT No.: PCT/JP02/11222

§ 371 (c)(1),
(2), (4) Date: Apr. 22, 2004

(87) PCT Pub. No.: WO03/038571

PCT Pub. Date: May 8, 2003

(65) Prior Publication Data

US 2004/0250089 A1  Dec. 9, 2004

(30) Foreign Application Priority Data

Oct. 30, 2001 (JP) ............................. 2001-332194

(51) Int. Cl.
*G06F 9/00* (2006.01)
(52) U.S. Cl. ................ 713/182; 713/185; 713/189; 713/193; 713/164; 713/166
(58) Field of Classification Search ............... 713/182, 713/185, 189, 193, 164, 166
See application file for complete search history.

(56) References Cited

FOREIGN PATENT DOCUMENTS

| EP | 0 715 242 | 6/1996 |
|---|---|---|
| EP | 0 994 475 | 4/2000 |
| EP | 1 061 514 | 12/2000 |

(Continued)

OTHER PUBLICATIONS

Rankl W; Effing W: "Handbuch Der Chipkarten. Aufbaufunktionsweise-Einsatz von Smart Cards", 1996, Carl Hanser Verlag, De, München along with partial English translation.

(Continued)

*Primary Examiner*—Thomas R. Peeso
(74) *Attorney, Agent, or Firm*—Wenderoth, Lind & Ponack, L.L.P.

(57) ABSTRACT

A data processing device 10 is composed of a data storage unit 11 that stores first authentication data, second medium authentication data generated by applying a predetermined encryption to the first medium authentication data, and second device authentication data generated by applying the predetermined encryption to first device authentication data; a medium authentication data transmission unit 12 transmits the first medium authentication data; an encrypted data reception unit 13 receives first encrypted data; an authentication unit 14 authenticates an information recording medium 30 when the first encrypted data and the second medium authentication data are identical; a device authentication data reception unit 15 receives the first device authentication data; and a device authentication data transmission unit 16 transmits the second device authentication data. Mutual authentication processing can be performed without the data processing device having a unit for encrypting, and by using data each time. Developers of various types of software can perform data transfer operation checking, debugging and the like without the risk of secret information being leaked.

26 Claims, 14 Drawing Sheets

FOREIGN PATENT DOCUMENTS

| | | |
|---|---|---|
| EP | 1 069 491 | 1/2001 |
| EP | 1 164 747 | 12/2001 |
| JP | 2001-211162 | 8/2001 |

OTHER PUBLICATIONS

Menezes; A J; Oorschot Van; PC; Vanstone; S A: "Handbook of Applied Cryptography", CRC Press, US, Boca Raton, Florida.

METHOD, SYSTEM, DEVICE AND COMPUTER PROGRAM FOR MUTUAL AUTHENTICATION AND CONTENT PROTECTION

TECHNICAL FIELD

The present invention relates to a data processing system in which mutual authentication takes place between a recording medium and a data processing device for the purpose of protecting digital works, and in particular to a technique that enables checking of operations and debugging of application software during development of the software, while preventing secret information being leaked in mutual authentication.

BACKGROUND ART

In recent years it has become common for digital data such as documents, audio, images and computer programs to be circulated via networks such as the Internet, and portable recording mediums such as CDs (compact disks). Such digital data does not deteriorate over time and anyone can easily copy it without loss of quality. Consequently, however, a disadvantage of such digital data is that copyrighted information is easily subject to illegal acts such as unauthorized copying and tampering.

Digital work protection systems that prevent such illegal acts are disclosed in Japanese laid-open patent application 2000-307567 and Japanese laid-open patent application 2001-211162.

In these digital work protection systems, a recording medium stores restriction information that shows copy restrictions and so on of the digital data, while a data processing device is able to restrict the number of generations of copies made of the digital data by either prohibiting copying or restricting the number of times the digital data is copied, according to the restriction information recorded on the recording medium. Furthermore, the recording medium and the data processing device perform authentication to authenticate each other's authenticity (hereinafter "mutual authentication processing") before digital data is transmitted. Transmission of useful data is not permitted when legitimacy is not mutually authenticated. This prevents restriction information being invalidated by an illegitimate apparatus.

In the mutual authentication processing, both the recording medium and the data processing device have the same secret encryption processing method. Each device independently generates a random number, transmits the generated random number to the other device, has the other device encrypt the random number and transmit the encrypted number back. The device that generated the random number also encrypts the random number that it generated and compares the result with the received random number. If the two are identical, the device authenticates the other device as being a legitimate device.

Note that the random number used in this kind of mutual authentication processing is usually a pseudo-random number is generated using a seed such as the current time.

In this way, it is a prerequisite in mutual authentication processing for both devices to have the same secret encryption processing method. Since different data is transmitted each time, even if an illegitimate device intercepts the data being transmitted, the risk that the illegitimate device will be able to masquerade as a legitimate device is low.

Although developers wish to perform operation checks and debugging of data transfer when developing various types of software, such as application software for purposes such as creating documents, tables and data bases and managing e-mail, driver software for controlling the hardware connected to a computer, and firmware which is software included in devices for performing basic control of connected devices, such operation checking and debugging is made difficult by the fact that the above described mutual authentication processing involves transferring different data each time.

One possible solution is to distribute mutual authentication software that realizes mutual authentication encryption processing to developers to make operation checking, debugging and the like of data transfer relatively easy. However, since there-are numerous companies that develop various types of application software, it would be difficult to protect all secret information thoroughly. There is a danger that, for example, a malicious developer will analyze the distributed mutual authentication software and leak the encryption processing method. For this reason, the mutual authentication software cannot be distributed in the same form to all developers. However, making the mutual authentication software tamper-resistant is undesirable due to the effort and cost required.

To solve this problem, the object of the present invention is to provide a data processing system, a data processing method, a recording medium and a data processing device that are part of the data processing system, a data processing program for use in the data processing device, and a program recording medium on which the data processing program is recorded that enable data transfer operation checking, debugging and the like in mutual authentication processing, even if the encryption method is unknown to one of the parties.

DISCLOSURE OF THE INVENTION

A data processing system of the present invention is a data processing system that includes a data processing device and a recording medium that perform mutual authentication, and permits transfer of useful data only when the data processing device and the recording medium authenticate each other as being legitimate, the data processing device including: a medium authentication data storage unit operable to store first medium authentication data, and second medium authentication data generated by applying a predetermined encryption to the first medium authentication data; a medium authentication data transmission unit operable to transmit the first medium authentication data to the recording medium; an encrypted data reception unit operable to receive first encrypted data that has been generated by the recording medium by applying an encryption included in the recording medium to the transmitted first medium authentication data; a medium authentication unit operable to judge whether the received first encrypted data and the stored second medium authentication data are identical, and when the judgement is positive, authenticate the recording medium as being legitimate; a first device authentication data reception unit operable to receive first device authentication data from the recording medium; a device authentication data storage unit operable to store second device authentication data generated by applying the predetermined encryption to the first device authentication data; and a second device authentication data transmission unit operable, when the first device authentication data reception unit receives the first device authentication data, to transmit the stored second device authentication data to the recording medium; and the recording medium including: a medium authentication data reception unit operable to receive the first medium authentication data from the data processing device; a first encryption unit operable to generate the first encrypted data by applying the encryption included in the recording medium to the received first medium authentication data; an encrypted data transmission unit operable to transmit the generated first encrypted data to the data processing device; a device authentication data output unit operable to output the first device authentication data; a first device authentication data transmission unit operable to transmit the output first device authentication data to the data processing device; a second encryption unit operable to generate second encrypted data by applying the encryption to the output first device authentication data; a second device authentication data reception unit operable to receive the second device authentication data from the data processing device; and a device authentication unit operable to judge whether the received second device authentication data and the generated second encrypted data are identical, and when the judgement is positive, authenticate the data processing device as being legitimate. Furthermore, a data processing system of the present invention is a data processing system that includes a data processing device and a recording medium that perform mutual authentication, and permits transfer of useful data only when the data processing device and the recording medium authenticate each other as being legitimate, the data processing device including: a first medium authentication data storage unit operable to store first medium authentication data, and second medium authentication data generated by applying a predetermined encryption to the first medium authentication data; a first medium authentication data transmission unit operable to transmit the first medium authentication data to the recording medium; a first medium authentication data reception unit operable to receive third medium authentication data generated by applying a predetermined encryption to the first medium authentication data from the recording medium; a medium authentication unit operable to judge whether the received third medium authentication data and the stored second medium authentication data are identical, and when the judgement is positive, authenticate the recording medium as being legitimate; a first device authentication data reception unit operable to receive first device authentication data from the recording medium; a first device authentication data storage unit operable to store second device authentication data generated by applying the predetermined encryption to the first device authentication data; and a second device authentication data transmission unit operable, when the first device authentication data reception unit receives the first device authentication data, to transmit the second device authentication data to the recording medium; and the recording medium including: a second medium authentication data reception unit operable to receive the first medium authentication data from the data processing device; a second medium authentication data storage unit operable to store the third authentication data; a second medium authentication data transmission unit operable, when the second medium authentication data reception unit receives the first medium authentication data, to transmit the third medium authentication data to the data processing device; a second device authentication data storage unit operable to store the first device authentication data, and third device authentication data that has been generated by applying the predetermined encryption to the first device authentication data; a first device authentication data transmission unit operable to transmit the stored first device authentication data to the data processing device; a second device authentication data reception unit operable to receive the second device authentication data from the data processing device; and a device authentication unit operable to judge whether the received second device authentication data and the stored third device authentication data are identical, and when the judgement is positive, authenticate the data processing device as being legitimate.

According to the stated structures, mutual authentication processing can be performed without the data processing device having a unit for encrypting, and by using the same data each time.

Consequently, developers of various types of software can perform data transfer operation checking, debugging and the like without the risk of secret information being leaked to other developers.

Furthermore, the recording medium may further include: a counting unit operable to store a number of times that mutual authentication processing has been executed; and a usage count restriction unit operable to judge whether the number stored by the counting unit has reached a predetermined number, and, when the judgement is positive, stop mutual authentication processing and prohibit transfer of the useful data, and when the judgement is negative, have the mutual authentication processing continue.

According to the stated structure, data transfer is not permitted when the count reaches a predetermined number, therefore the recording medium can prevent illegitimate, general use of larger amounts of data when the information recording medium is in a state for operation checking, debugging and the like, by setting the predetermined number to a relatively small number.

Furthermore, the recording medium may be portable and be mounted in the data processing device by a user, and the counting unit may reset the number each time the recording medium is mounted in the data processing device.

According to the stated structure, continuous data transfer is not permitted unless the recording medium is remounted in the data processing device. Therefore, if the amount of data that can be transferred continuously is set to an amount that is greater than an amount necessary for operation checking, debugging and the like during development of various types of software but that is insufficient for normal use of music data, operation checking, debugging and the like can be performed numerous times while illegitimate use of normal music data can be prevented.

Furthermore, the counting unit may reset the number each time predetermined data is received from the data processing device.

According to the stated structure, continuous data transfer is not permitted unless the recording medium receives predetermined data. Therefore, if the amount of data that can be transferred continuously is set to an amount that is greater than an amount necessary for operation checking, debugging and the like during development of various types of software but that is insufficient for normal use of music data, operation checking, debugging and the like can be performed numerous times while illegitimate use of normal music data can be prevented.

Furthermore, the recording medium may be portable and be mounted in the data processing device by a user, and the device authentication data output unit may output predetermined data as the first device authentication data each time the recording medium is mounted in the data processing device. Furthermore, the recording medium may be portable and be mounted in the data processing device by a user, and the first device authentication data transmission unit may transmit the stored first device authentication data to the data processing device each time the recording medium is mounted in the data processing device.

According to the stated structure, device authentication is started each time the recording medium is mounted in the data processing device, therefore the risk that an illegitimate device will masquerade as a legitimate device is low.

Here, the recording medium may further include: a switch unit that is set to either a first state or a second state by a user, and the device authentication data output unit, when the switch unit is in the first state, may output predetermined data as the first device authentication data, and when the switch unit is in the second state, output a random number each time as the first device authentication data, the random number being different each time.

According to the stated structure, the recording medium can be adapted for normal use and for use in operation checking, debugging and the like during development of various types of software, by switching the switch.

Furthermore, the device authentication data output unit may output predetermined data as the first device authentication data each time predetermined data is received from the data processing device.

According to the stated structure, device authentication starts each time predetermined data is received, therefore device authentication can be started arbitrarily, and a test program can be used for operation checking.

Furthermore, the predetermined data may be one of (a) a pseudo-random number that is generated using a predetermined initial value as a seed, (b) a predetermined random number, (c) a random number selected according to command data from the data processing device, (d) a number designated according to command data from the data processing device, and (e) a sequential number. Furthermore, the stored first device authentication data may be one of (a) a pseudo-random number that is generated using a predetermined initial value as a seed, (b) a predetermined random number, (c) a random number selected according to command data from the data processing device, (d) a number designated according to command data from the data processing device, and (e) a sequential number.

According to the stated structure, the device authentication data output unit can be used in normal mutual authentication as a pseudo-random number generation unit, a storage unit, or a reception unit.

A data processing method of the present invention is a data processing method that performs mutual authentication between a data processing device and a recording medium, and permits transfer of useful data only when the data processing device and the recording medium authenticate each other as being legitimate, the data processing device including a medium authentication data storage unit operable to store first medium authentication data, and second medium authentication data generated by applying a predetermined encryption to the first medium authentication data; and a device authentication data storage unit operable to store second device authentication data generated by applying the predetermined encryption to first device authentication data, the data processing method including: a medium authentication data transfer step of transferring the first medium authentication data to the recording medium; a first encryption step of, in the recording medium, generating first encrypted data by applying an encryption included in the recording medium to the transferred first medium authentication data; an encrypted data transfer step of transferring the generated first encrypted data to the data processing device; a medium authentication step of, in the data processing device, judging whether the transferred first encrypted data and the stored second medium authentication data are identical, and when the judgement is positive, authenticating the recording medium as being legitimate; a device authentication data output step of, in the recording medium, outputting the first device authentication data; a first device authentication data transfer step of transferring the output first device authentication data to the data processing device; a second encryption step of, in the recording medium, generating second encrypted data by applying the encryption included in the recording medium to the output first device authentication data; a second device authentication data transfer step of, when the first device authentication data has been transferred by the first device authentication data transfer step, transferring the stored second device authentication data to the recording medium; and a device authentication step of, in the recording medium, judging whether the transferred second device authentication data and the generated second encrypted data are identical, and when the judgement is positive, authenticating the data processing device as being legitimate. Furthermore, a data processing method of the present invention is a data processing method that performs mutual authentication between a data processing device and a recording medium, and permits transfer of useful data only when the data processing device and the recording medium authenticate each other as being legitimate, the data processing device including a first medium authentication data storage unit operable to store first medium authentication data, and second medium authentication data generated by applying a predetermined encryption to the first medium authentication data; and a first device authentication data storage unit operable to store second device authentication data generated by applying the predetermined encryption to first device authentication data, the recording medium including a second medium data storage unit operable to store third medium authentication data generated by applying a predetermined encryption to the first medium authentication data; and a second device authentication data storage unit operable to store the first device authentication data, and third device authentication data generated by applying the predetermined encryption to the first device authentication data, the data processing method including: a first medium authentication data transfer step of transferring the stored first medium authentication data to the recording medium; a second medium authentication data transfer step of, when the first medium authentication data has been transferred, transferring the stored third medium authentication data to the data processing device; a medium authentication step of, in the data processing device, judging whether the transferred third medium authentication data and the stored second medium authentication data are identical, and when the judgement is positive, authenticating the recording medium as being legitimate; a first device authentication data transfer step of transferring the stored first device authentication data to the data processing device; a second device authentication data transfer step of, when the first device authentication data has been transferred, transferring the stored second device authentication data to the recording medium; and a device authentication step of, in the recording medium, judging whether the transferred second device authentication data and the stored third device authentication data are identical, and when the judgement is positive, authenticating the data processing device as being legitimate.

The data processing device of the present invention is a data processing device in a data processing system in which the data processing device and a recording medium perform mutual authentication, the data processing system permitting transfer of useful data only when the data processing device and the recording medium authenticate each other as being legitimate, the data processing device including: a medium authentication data storage unit operable to store first medium authentication data, and second medium authentication data generated by applying a predetermined encryption to the first medium authentication data; a medium authentication data transmission unit operable to transmit the first medium authentication data to the recording medium; an encrypted data reception unit operable to receive first encrypted data that has been generated by the recording medium by applying an encryption included in the recording medium to the transmitted first medium authentication data; a medium authentication unit operable to judge whether the received first encrypted data and the stored second medium authentication data are identical, and when the judgement is positive, authenticate the recording medium as being legitimate; a first device authentication data reception unit operable to receive first device authentication data from the recording medium; a device authentication data storage unit operable to store second device authentication data generated by applying the predetermined encryption to the first device authentication data; and a second device authentication data transmission unit operable, when the first device authentication data reception unit receives the first device authentication data, to transmit the stored second device authentication data to the recording medium. Furthermore, a data processing device of the present invention is a data processing device in a data processing system in which the data processing device and a recording medium perform mutual authentication, the data processing system permitting transfer of useful data only when the data processing device and the recording medium authenticate each other as being legitimate, the data processing device including: a first medium authentication data storage unit operable to store first medium authentication data, and second medium authentication data generated by applying a predetermined encryption to the first medium authentication data; a first medium authentication data transmission unit operable to transmit the first medium authentication data to the recording medium; a first medium authentication data reception unit operable to receive third medium authentication data generated by applying a predetermined encryption to the first medium authentication data from the recording medium; a medium authentication unit operable to judge whether the received third medium authentication data and the stored second medium authentication data are identical, and when the judgement is positive, authenticate the recording medium as being legitimate; a first device authentication data reception unit operable to receive first device authentication data from the recording medium; a first device authentication data storage unit operable to store second device authentication data generated by applying the predetermined encryption to the first device authentication data; and a second device authentication data transmission unit operable, when the first device authentication data reception unit receives the first device authentication data, to transmit the second device authentication data to the recording medium.

A data processing program of the present invention is a data processing program that executes in a data processing device a data processing method by which the data processing device and a recording medium perform mutual authentication, the data processing method permitting transfer of useful data only when the data processing device and the recording medium authenticate each other as being legitimate, the data processing device including a medium authentication data storage unit operable to store first medium authentication data, and second medium authentication data generated by applying a predetermined encryption to the first medium authentication data; and a device authentication data storage unit operable to store second device authentication data generated by applying the predetermined encryption to first device authentication data, the data processing program including: a medium authentication data transmission step of transmitting the first medium authentication data to the recording medium; an encrypted data reception step of receiving first encrypted data that has been generated by the recording medium by applying an encryption included in the recording medium to the transmitted first medium authentication data; a medium authentication step of judging whether the received first encrypted data and the stored second medium authentication data are identical, and when the judgement is positive, authenticating the recording medium as being legitimate; a first device authentication data reception step of receiving the first device authentication data from the recording medium; and a second device authentication data transmission step of, when the first device authentication data reception unit receives the first device authentication data, transmitting the stored second device authentication data to the recording medium. Furthermore, a data processing program of the present invention is a data processing program that executes in a data processing device a data processing method by which the data processing device and a recording medium perform mutual authentication, the data processing method permitting transfer of useful data only when the data processing device and the recording medium authenticate each other as being legitimate, the data processing device including a medium authentication data storage unit operable to store first medium authentication data, and second medium authentication data generated by applying a predetermined encryption to the first medium authentication data; and a device authentication data storage unit operable to store second device authentication data generated by applying the predetermined encryption to first device authentication data, the data processing program including: a first medium authentication data transmission step of transmitting the first medium authentication data to the recording medium; a first medium authentication data reception step of receiving third medium authentication data generated by applying a predetermined encryption to the first medium authentication data from the recording medium; a medium authentication step of judging whether the received third medium authentication data and the stored second medium authentication data are identical, and when the judgement is positive, authenticating the recording medium as being legitimate; a first device authentication data reception step of receiving the first device authentication data from the recording medium; and a second device authentication data transmission step of, when the first device authentication data reception unit receives the first device authentication data, transmitting the second device authentication data to the recording medium.

The program recording medium on which a data processing program of the present invention is recorded is a computer-readable program recording medium having recorded thereon a data processing program that executes on a computer a data processing method by which a data processing device and a recording medium perform mutual authentication, the data processing method permitting transfer of useful data only when the data processing device and the recording medium authenticate each other as being legitimate, the data processing device including a medium authentication data storage unit operable to store first medium authentication data, and second medium authentication data generated by applying a predetermined encryption to the first medium authentication data; and a device authentication data storage unit operable to store second device authentication data generated by applying the predetermined encryption to first device authentication data, the data processing program including: a medium authentication data transmission step of transmitting the first medium authentication data to the recording medium; an encrypted data reception step of receiving first encrypted data that has been generated by the recording medium by applying an encryption included in the recording medium to the transmitted first medium authentication data; a medium authentication step of judging whether the received first encrypted data and the stored second medium authentication data are identical, and when the judgement is positive, authenticating the recording medium as being legitimate; a first device authentication data reception step of receiving the first device authentication data from the recording medium; and a second device authentication data transmission step of, when the first device authentication data reception unit receives the first device authentication data, transmitting the stored second device authentication data to the recording medium. Furthermore, the program recording medium on which a data processing program of the present invention is recorded is a computer-readable program recording medium having recorded thereon a data processing program that executes on a computer a data processing method by which a data processing device and a recording medium perform mutual authentication, the data processing method permitting transfer of useful data only when the data processing device and the recording medium authenticate each other as being legitimate, the data processing device including a medium authentication data storage unit operable to store first medium authentication data, and second medium authentication data generated by applying a predetermined encryption to the first medium authentication data; and a device authentication data storage unit operable to store second device authentication data generated by applying the predetermined encryption to first device authentication data, the data processing program including: a first medium authentication data transmission step of transmitting the first medium authentication data to the recording medium; a first medium authentication data reception step of receiving third medium authentication data generated by applying a predetermined encryption to the first medium authentication data from the recording medium; a medium authentication step of judging whether the received third medium authentication data and the stored second medium authentication data are identical, and when the judgement is positive, authenticating the recording medium as being legitimate; a first device authentication data reception step of receiving the first device authentication data from the recording medium; and a second device authentication data transmission step of, when the first device authentication data reception unit receives the first device authentication data, transmitting the second device authentication data to the recording medium.

A recording medium of the present invention is a recording medium in a data processing system in which a data processing device and the recording medium perform mutual authentication, the data processing system permitting transfer of useful data only when the data processing device and the recording medium authenticate each other as being legitimate, the recording medium including: a medium authentication data reception unit operable to receive first medium authentication data from the data processing device; a first encryption unit operable to generate first encrypted data by applying encryption included in the recording medium to the received first medium authentication data; an encrypted data transmission unit operable to transmit the generated first encrypted data to the data processing device; a device authentication data output unit operable to output first device authentication data; a first device authentication data transmission unit operable to transmit the output first device authentication data to the data processing device; a second encryption unit operable to generate second encrypted data by applying the encryption to the output first device authentication data; a second device authentication data reception unit operable to receive second device authentication data from the data processing device; and a device authentication unit operable to judge whether the received second device authentication data and the generated second encrypted data are identical, and when the judgement is positive, authenticate the data processing device as being legitimate. Furthermore, a recording medium of the present invention is a recording medium in a data processing system in which a data processing device and the recording medium perform mutual authentication, the data processing system permitting transfer of useful data only when the data processing device and the recording medium authenticate each other as being legitimate, the recording medium including: a second medium authentication data reception unit operable to receive first medium authentication data from the data processing device; a second medium authentication data storage unit operable to store third medium authentication data; a second medium authentication data transmission unit operable, when the second medium authentication data reception unit receives the first medium authentication data, to transmit the third medium authentication data to the data processing device; a second device authentication data storage unit operable to store first device authentication data, and third device authentication data that has been generated by applying the predetermined encryption to the first device authentication data; a first device authentication data transmission unit operable to transmit the stored first device authentication data to the data processing device; a second device authentication data reception unit operable to receive second device authentication data from the data processing device; and a device authentication unit operable to judge whether the received second device authentication data and the stored third device authentication data are identical, and when the judgement is positive, authenticate the data processing device as being legitimate.

According to the stated structures, mutual authentication processing can be performed without the data processing device having a unit for encrypting, and by using the same data each time.

Consequently, developers of various types of software can perform data transfer operation checking, debugging and the like without the risk of secret information being leaked to other developers.

BEST MODE FOR CARRYING OUT THE INVENTION

First Embodiment

<Outline>

The first embodiment of the present invention is a system in which mutual authentication processing is performed between a personal computer and a memory card, and use of data is permitted only when the personal computer and the memory card authenticate each other as being legitimate. The system is for use in operation checking, debugging and the like during development of various types of software. Instead of having a program for performing encryption processing in mutual authentication, the personal computer stores in advance fixed authentication data and encrypted data that has been encrypted by applying the encryption processing that is used in mutual authentication to the authentication data. The authentication data and the encrypted data are used each time mutual authentication processing is performed.

<Structure>

Figure 1:
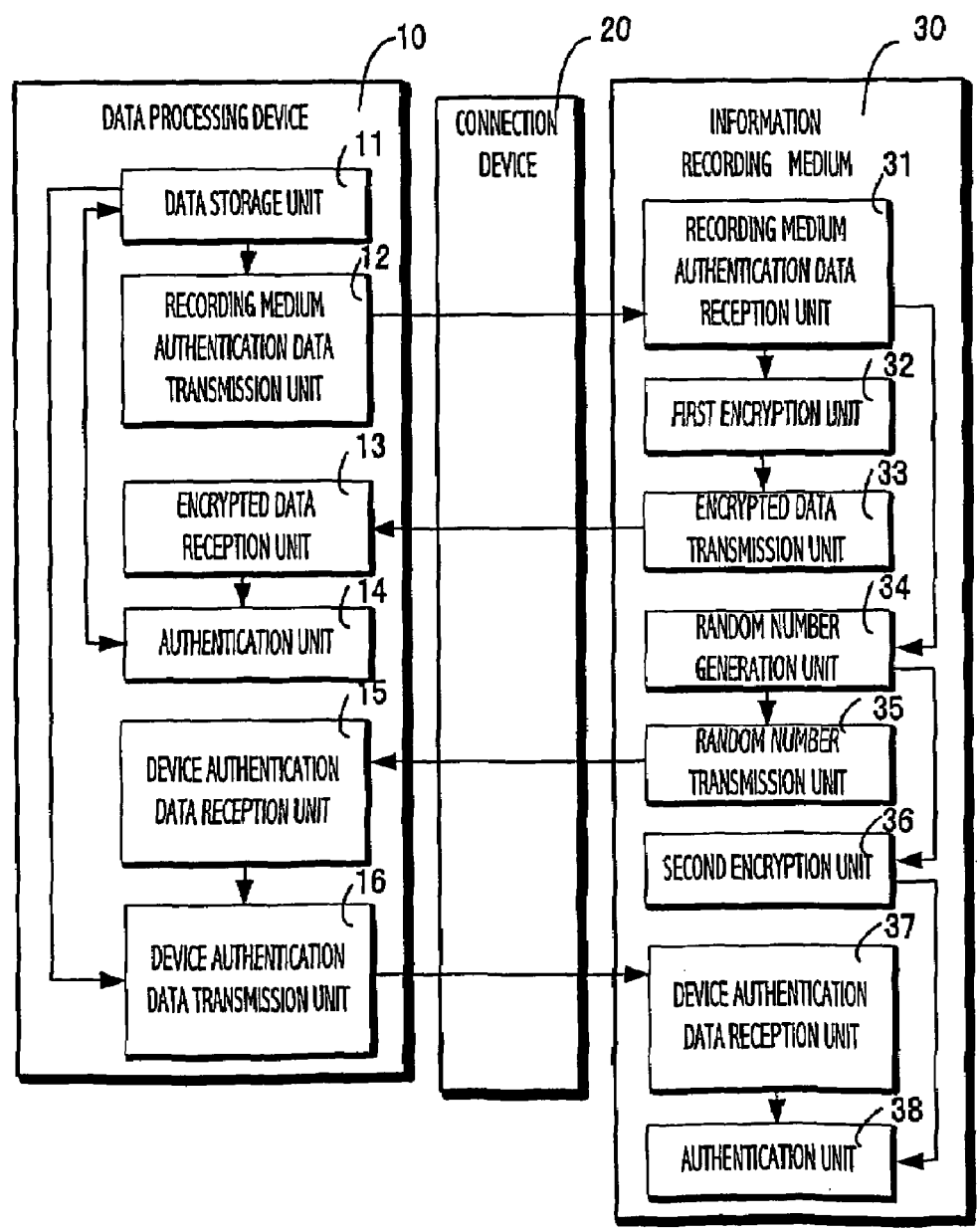
FIG. 1 shows an outline of a data processing system of a first embodiment of the present invention.

FIG. 1 shows an outline of the data processing system of the first embodiment of the present invention.

The data processing system shown in FIG. 1 includes a data processing device 10, a connection device 20 and an information recording medium 30.

The data processing device 10 is, for example, a general-purpose computer such as a personal computer that executes software for operation checking, debugging, and the like, and includes a data storage unit 11, a medium authentication data transmission unit 12, an encrypted data reception data unit 13, an authentication unit 14, a device authentication data reception unit 15 and a device authentication data transmission unit 16.

Specifically, the data storage unit 11 is, for example, a hard disk in the personal computer. The medium authentication data transmission unit 12, the encrypted data reception data unit 13, the device authentication data reception unit 15 and the device authentication data transmission unit 16 are, for example, software in the personal computer such as drivers. The authentication unit 14 is, for example, application software that operates in the personal computer.

The connection device 20 is, for example, a card slot for a memory card, and is connected fixedly to the data processing apparatus 10. A memory card that has been selected for use can be mounted in the connection device 20 easily and quickly, and data transmission performed according to software such as firmware incorporated into integrated circuits. Here, the information recording medium 30 is mounted in the connection device 20.

The information recording medium 30 is, for example, an SD memory card, and includes a semiconductor memory and a CPU. The information recording medium 30 is an intelligent memory card that includes a rights protection function that permits data transmission between the semiconductor memory and an external device on the condition that mutual authentication processing is established. The information recording medium 30 includes a recording medium authentication data reception unit 31, a first encryption unit 32, an encrypted data transmission unit 33, a random number generation unit 34, a random number transmission unit 35, a second encryption unit 36, a device authentication data reception unit 37 and an authentication unit 38.

The data storage unit 11 stores data for mutual authentication processing and for data transmission. The data stored by the data storage unit 11 includes first medium authentication data, second medium authentication data (V'2) and second device authentication data (V1). The second medium authentication data is generated by applying a predetermined encryption processing to the first medium authentication data. The second device authentication data is generated by applying the predetermined encryption processing to first device authentication data. The data is, for example, stored in the hard disk as file data.

The first medium authentication data and the first device authentication data are each, for example, a 56-bit or a 64-bit random number. The predetermined encryption processing converts the 56-bit or 64-bit data to different 64-bit data. Since it is necessary to use a conversion method that cannot be analyzed from the original data and the data that results from conversion, an F function used in the DES decryption method is preferable because it is not reversible. Here, the first medium authentication data for operation checking, debugging and the like is referred to as random number A (R_a), and the first device authentication data for operation checking, debugging and the like is referred to as random number B (R_b).

Furthermore, here in the predetermined encryption processing the original data is calculated with unique information (K_a) using calculation processing (E_a). If the original data is the random number A (R_a), the second medium authentication data (V'2) can be expressed as:

$$\text{second medium authentication data}(V'2)=E\_a(K\_a, R\_a). \quad \text{(expression 1)}$$

If the original data is the random number B (R_b), the second device authentication data (V1) can be expressed as:

$$\text{second device authentication data}(V1)=E\_a(K\_a, R\_b). \quad \text{(expression 2)}$$

Figure 2A:
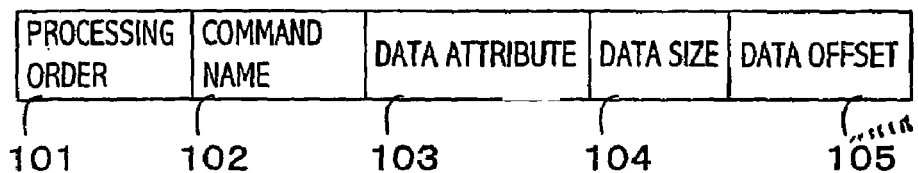
FIGS. 2A to 2C show an example of a file name and file structure of data that is stored in the data storage unit 11 and that is for data transfer, mutual authentication processing, etc.
Figure 2B:
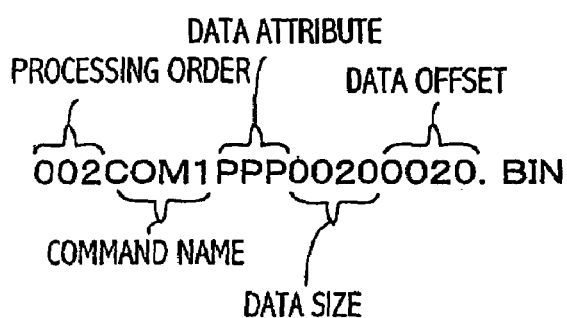
Figure 2C:
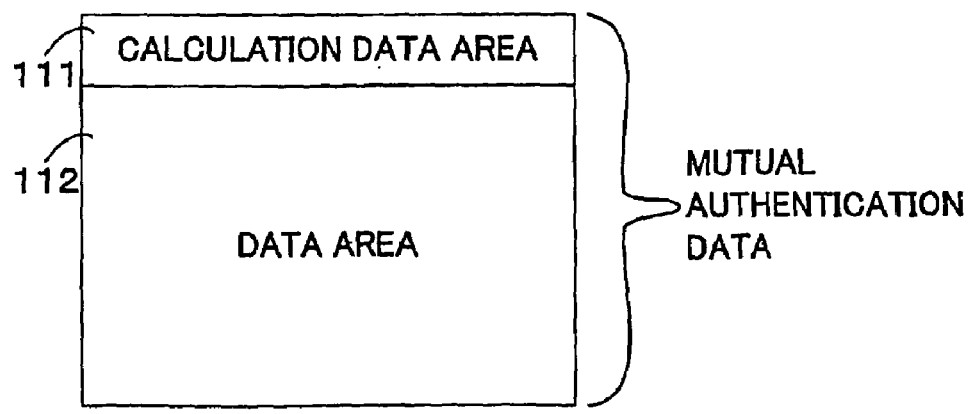

FIGS. 2A to 2C show an example of the file name and file structure of data for data transmission and for mutual authentication processing stored in the data storage unit 11.

As FIG. 2A shows, the file name of the data for transmission and for mutual authentication processing includes various types of information: a processing order 101, a command name 102, a data attribute 103', a data size 104 and a data offset 105.

Specifically, as shown in FIG. 2B, the file name of the data for transmission and for mutual authentication processing is composed of a processing order "2", a command name "COM1", a data file attribute "PPP", a data size "20 sectors" and data offset "20 sectors". Here ".BIN" is a file extension.

Furthermore, as shown in FIG. 2C the data file for transmission and for mutual authentication processing is composed of a calculation data area 111 and a data area 112. The calculation data area 111 stores data for mutual authentication processing, such as the number of times mutual authentication processing has been executed and the result of the mutual authentication processing. This data is stored either in one file or divided into a plurality of files. The data area 112 stores data for data transmission with the information recording medium 30.

Each time the information recording medium 30 is mounted in the connection device 20, before data is transmitted, and each time a pre-determined input (hereinafter referred to as an "authentication processing start command") is received from the user, the medium authentication data transmission unit 12 judges whether the number of times mutual authentication processing has been executed (hereinafter referred to as a "mutual authentication processing count") has reached a predetermined number. If the predetermined number has been reached, the medium authentication data transmission unit 12 notifies the user to this effect and ends the processing. If the predetermined number has not been reached, the medium authentication data transmission unit 12 transmits the random number A (R_a) stored in the data storage unit 11 to the information recording medium 30.

Suppose, for example, that the mutual authentication processing count is to be reset each time the information recording medium is mounted in the connection device or every time a file is accessed, and mutual authentication processing is counted each time data of approximately one to two kilobytes is accessed. Here the predetermined number in the random number generation unit 52 needs to be at least 6 in order to include issuing of one write command in write processing and one read command in read processing for each of the head part, the intermediate part and the end part of the area for which operation checking, debugging and the like is to be performed. However, realistically it is appropriate to set the predetermined number to several tens of times, and preferably to a number that is less than the number of times necessary for mutual authentication for normal use of music data.

The encrypted data reception unit 13 receives the random number A (R_a) sent by the medium authentication data transmission unit 12 in the information recording medium 30, and receives the first encrypted data (V2) that has been generated by applying the encryption processing in the information recording medium 30 to the random number A (R_a), from the information recording medium 30.

The authentication unit 14 uses comparison processing (C_a) to compare the first encrypted data (V2) received by the encrypted data reception unit 13 and the second medium authentication data (V'2) stored in the data storage area 11 and judge whether the two pieces of data are identical or not. When the two pieces of data are identical, the authentication unit 14 authenticates the information recording medium 30 as being legitimate. When the two pieces of data are not identical, the authentication unit 14 does not authenticate the information recording medium 30 as being legitimate, but instead the system notifies the user that mutual device authentication failed, where the mutual authentication failed, and other information, then ends the processing.

Figure 3:
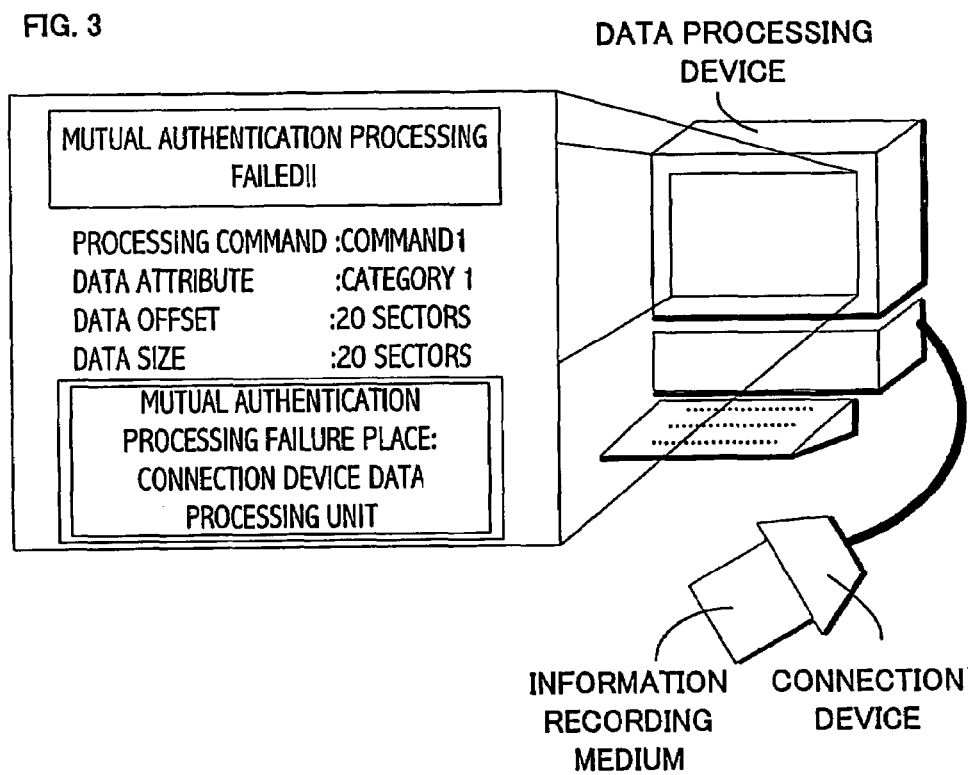
FIG. 3 shows an example of a screen displayed on a monitor when an authentication unit 14 does not authenticate an information recording medium 30 as being legitimate.

FIG. 3 shows one example of a screen displayed by the monitor when the information recording medium 30 is not authenticated as being legitimate by the authentication unit 14.

The authentication unit 14 also updates mutual authentication processing data stored in the data storage unit 11, such as the mutual authentication processing count and the mutual authentication processing result.

The device authentication data reception unit 15 receives the first device authentication data from the information recording medium 30, and during operation checking, debugging and soon, receives the random number B (R_b) as the first device authentication data during operation checking, debugging and the like.

When the first device authentication data is received by the device authentication data reception unit 15, the device authentication data transmission unit 16 transmits the second device authentication data (V1) stored in the data storage unit 11 to the information recording medium 30.

The medium authentication data reception unit 31 receives the first medium authentication data from the data processing device 10, and during operation checking, debugging and the like, receives the random number A (R_a) as the first medium authentication data.

The first encryption unit 32 generates the first encrypted data (V2) by applying encryption processing to the first medium authentication data received by the medium authentication data reception unit 31. Here, in the encryption processing the original data is calculated with unique information (K_b) using calculation processing (E_b). In operation checking, debugging and the like the original data is the random number A (R_a), therefore the first encrypted data (V2) can be expressed as:

$$\text{first encrypted data}(V2)=E\_b(K\_b,R\_a). \quad \text{(expression 3)}$$

The encrypted data transmission unit 33 transmits the first encrypted data (V2) generated by the first encryption unit 32 to the data processing device 10.

The random number generation unit 34 generates a random number each time the information recording medium 30 is mounted in the connection device 20, before data is transmitted, and each time first medium authentication data is received by the medium authentication data reception unit 31. Here, the random number generation unit 34 is a pseudo-random number generation apparatus, and generates a 56 bits or 64 bit pseudo-random number using the number of seconds of the current time, each time the medium authentication data reception unit 31 receives first medium authentication data.

Furthermore, every time the information recording medium 30 is mounted in the connection device 20, the random number generation unit 34 generates a random number as a predetermined initial value of the random number seed, which it provides as the random number B (R_b).

Note that is it possible for the random number generation unit 34 to generate the random number as the predetermined initial value of the random number seed which it provides as the random number B (R_b) each time the random number A (R_a) is received by the medium authentication data reception unit 31 as the first medium authentication data, or each time special command data is transmitted from the data processing device 10 according to the user inputting predetermined content into the data processing device 10.

The random number transmission unit 35 transmits the random number generated by the random number generation unit 34 to the data processing device 10.

The second encryption unit 36 generates second encrypted data (V'1) by applying the same encryption method as the first encryption unit 32 to the random number generated by the random number generation unit 34. In operation checking, debugging and the like, the generated random number is the random number B (R_b), therefore the second encrypted data (V'1) can be expressed as:

second encrypted data$(V'1)=E\_b(K\_b,R\_b)$.   (expression 4)

The device authentication data reception unit 37 receives the second device authentication data (V1) from the data processing device 10.

The authentication unit 38 uses comparison processing (C_b) to compare the second device authentication data (V1) received from the device authentication data reception unit 37 and the second encrypted data (V'1) generated by the second encryption unit 36 and judge whether the two pieces of data are identical or not. When the two pieces of data are identical, the authentication unit 38 authenticates the data processing device 10 as being legitimate, and permits subsequent use of data.

Here, the comparison result in the authentication unit 14 in operation checking, debugging and the like can be expressed as:

comparison result=$C\_a(V2,V'2)$.

When the comparison result is that the two pieces of data are identical according to expression 1 and expression 3, calculation processing (E_a)=calculation processing (E_b) and unique information (K_a)=unique information (K_b).

Here, the predetermined encryption processing applied to the second medium authentication data (V'2) stored in the data storage unit 11 and the encryption processing in the first encryption unit 32 are identical. Accordingly, the data processing device 10 authenticates the information recording medium 30 as being legitimate.

Furthermore, the comparison result in the authentication unit 38 in operation checking, debugging and the like can be expressed as:

comparison result=$C\_b(V1,V'1)$.

When the comparison result is that the two pieces of data are identical according to expression 2 and expression 4, calculation processing (E_a)=calculation processing (E_b) and unique information (K_a) unique information (K_b).

Here, the predetermined encryption processing applied to the second device authentication data stored in the data storage unit 11 and the encryption processing in the second encryption unit 36 are identical. Accordingly, the information recording medium 30 authenticates the data processing device 10 as being legitimate.

<Operations>

Figure 4:
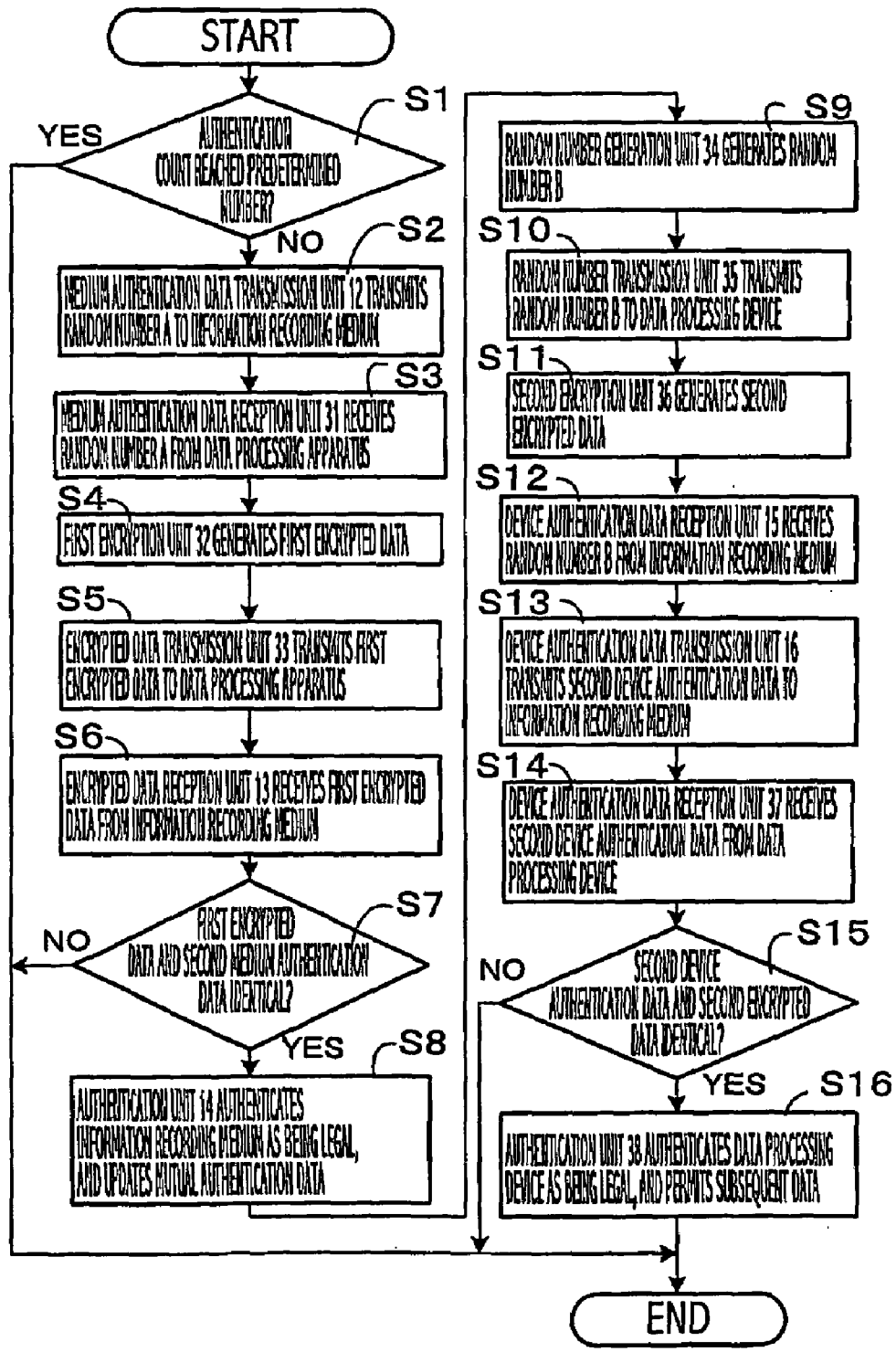
FIG. 4 shows operations for mutual authentication processing during operation checking, debugging and the like in the data processing system of the first embodiment of the present invention.

FIG. 4 shows the operations for mutual authentication processing during operation checking, debugging and the like, in the data processing system in the first embodiment of the present invention.

The following describes operations for mutual authentication processing during operation checking, debugging and the like.

(1) Each time the information recording medium 30 is mounted in the connection device 20, before data is transmitted, and each time an authentication processing start command is received from the user, the medium authentication data transmission unit 12 judges whether mutual authentication processing count has reached the predetermined number. If the predetermined number has been reached, the system notifies the user to this effect and ends the processing (step S1).

(2) If the predetermined number has not been reached, the medium authentication data transmission unit 12 transmits the random number A (R_a) stored in the data storage unit 11 to the information recording medium that is mounted in the connection device 20 (step S2)

(3) The medium authentication data reception unit 31 receives the random number A (R_a) (step 53)

(4) The first encryption unit 32 generates the first encrypted data (V2) by applying encryption processing included in the first encryption unit 32 itself to the random number A (R_a) received by the medium authentication data reception unit 31 (step S4).

(5) The encrypted data transmission unit 33 transmits the first encrypted data (V2) generated by the first encryption unit 32 to the data processing device (step 55)

(6) The encrypted data reception unit 13 receives the first encrypted data (V2) from the information recording medium (step S6).

(7) The authentication unit 14 compares the first encrypted data (V2) received by the encrypted data reception unit 13 and the second medium authentication data (V'2) stored in the data storage area 11 and judges whether the two pieces of data are identical or not. When the two pieces of data are not identical, the system notifies the user that mutual device authentication failed, where the mutual authentication failed, and other information, then ends the processing (step S7)

(8) When the two pieces of data are identical, the authentication unit 14 authenticates the information recording medium as being legitimate, and updates the information stored in the storage unit 11 about mutual device authentication, such as the mutual authentication processing count and the mutual authentication processing result (step SB)

(9) The random number generation unit 34 generates the random number B (R_b) (step S9).

(10) The random number generation 35 transmits the random number B (R_b) generated by the random number generation unit 34 to the data processing device (step S10).

(11) The second encryption unit 36 generates second encrypted data (V'l) by applying the same encryption method as the first encryption unit 32 to the random number generated by the random number generation unit (step S11).

(12) The device authentication data reception unit 15 receives the random number B (R_b) from the information recording medium (step S12).

(13) The device authentication data transmission unit 16 transmits the second device authentication data (V1) stored in the data storage unit 11 to the information recording medium 30 (step S13)

(14) The device authentication data reception unit 37 receives the second device authentication data (V1) from the data processing device (step S14)

(15) The authentication unit 38 compares the second device authentication data (V1) received by the device authentication data reception unit 37 and the second encrypted data (V'1) generated by the second encryption unit 36 and judges whether the two pieces of data are identical or not. When the two pieces of data are not identical, the system notifies the user that mutual device authentication failed, where the mutual authentication failed, and other information, then ends the processing (step S15).

(16) When the two pieces of data are identical, the authentication unit 38 authenticates the data processing device as being legitimate, and permits subsequent use of data (step S16).

<Conclusion>

In this way, in the data processing system of the first embodiment of the present invention, the data processing device 10 using pre-stored fixed authentication data and encrypted data, and during operation checking, debugging and the like when developing software, mutual device authentication is performed using the same data each time. Therefore, developers of various types of software are able to check data transfer operations and the like without fear of secret information being leaked.

Second Embodiment

<Outline>

Similar to the first embodiment, in the system in the second embodiment of the present invention the personal computer, instead of having a program for performing encryption processing in mutual authentication, stores fixed authentication data and encrypted data that has been generated by encrypting the authentication data, and uses this data each time mutual authentication processing is performed. In addition to the features of the first embodiment, in the second embodiment the memory card includes a switch, and by switching the switch, the user is able to use the memory card for either operation checking, debugging and the like during development of various types of software, or for normal operations.

<Structure>

Figure 5:
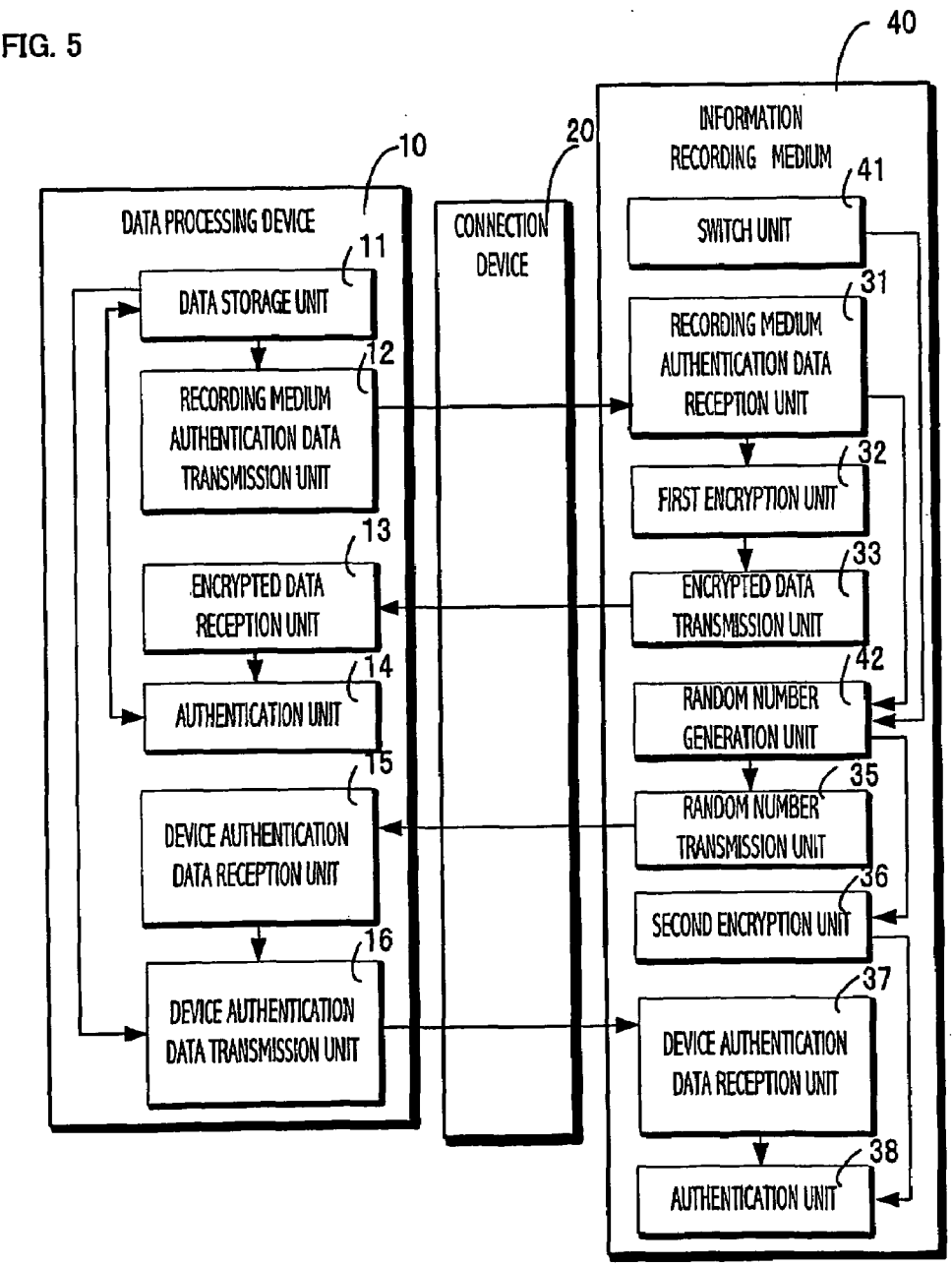
FIG. 5 shows an outline of a data processing system of a second embodiment of the present invention.

FIG. 5 shows an outline of the data processing system of the second embodiment of the present invention. The constitutional elements that are the same as those in the first embodiment have the same numbering thereas, and a description thereof is omitted.

The data processing system shown in FIG. 5 includes the data processing device 10, the connection device 20, and an information recording medium 40.

The information recording medium 40 is, for example, an SD memory card, and includes a semiconductor memory and a CPU. The information recording medium 40 is an intelligent memory card that includes a rights protection function that permits data transmission between the semiconductor memory and an external device on the condition that mutual authentication processing is established. The information recording medium 40 includes the medium authentication data reception unit 31, the first encryption unit 32, the encrypted data transmission unit 33, the random number generation unit 42, the random number transmission unit 35, the second encryption unit 36, the device authentication data reception unit 37, the authentication unit 38 and a switch unit 41.

The switch unit 41 includes a switch that is set by the user to either of two states. The user sets the switch to a first state for operation checking, debugging and the like during development of various types of software, and a second state for performing normal operations.

When the switch unit 41 is in the first state, each time first medium authentication data is received from the medium authentication data reception unit 31 the random number generation unit 42 generates a predetermined initial value as a random number seed, and uses the seed to generate a pseudo-random number which it supplies as a random number B (R_b). When the switch unit 41 is in the second state, the random number generation unit 42 generates a random number for device authentication each time the information recording medium 40 is mounted in the connection device 20, before data is transmitted, and each time first medium authentication data is transmitted by the medium authentication data reception unit 31.

<Operations>

Figure 6:
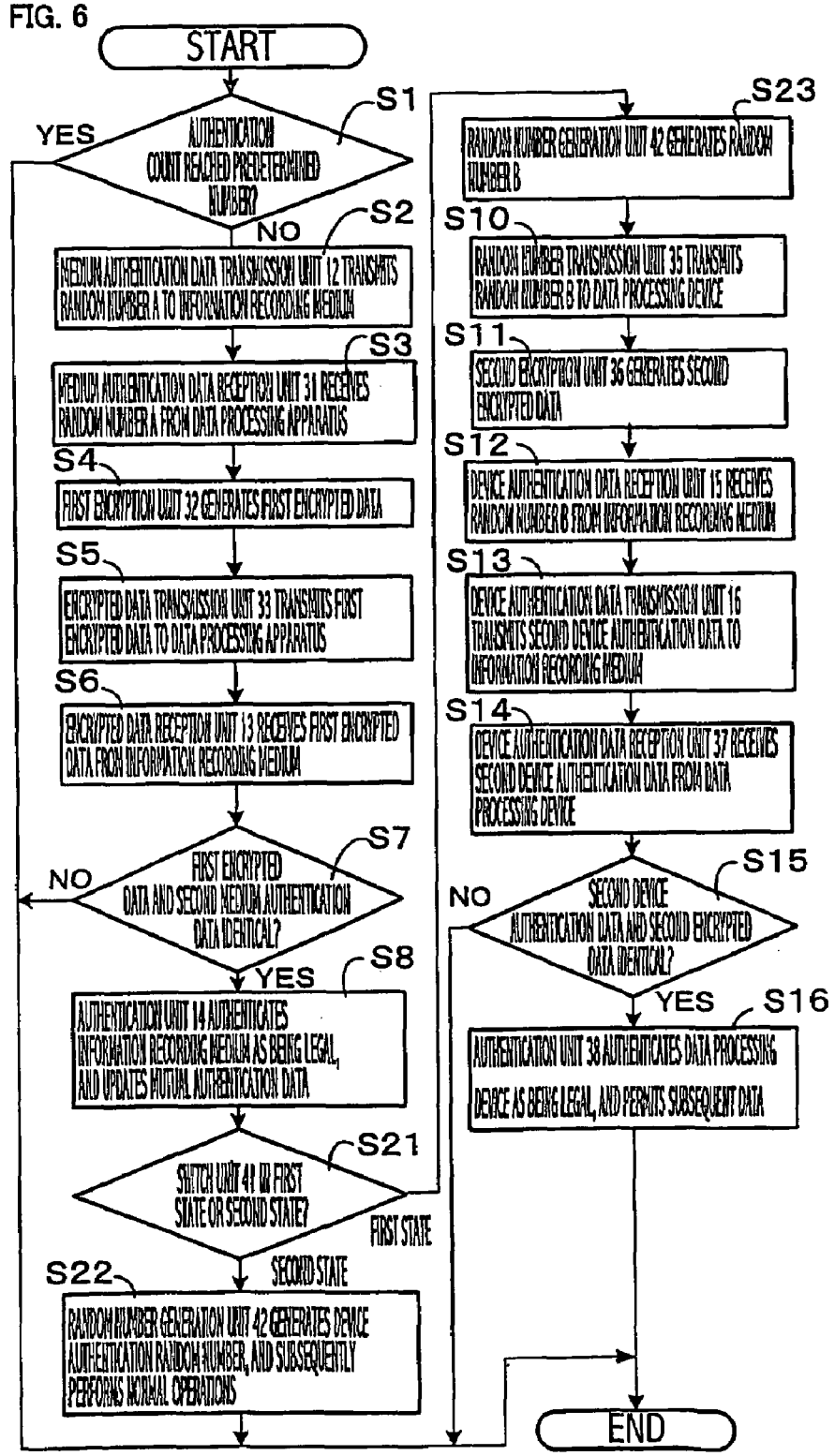
FIG. 6 shows operations for mutual authentication processing during operation checking, debugging and the like in the data processing system of the second embodiment of the present invention.

FIG. 6 shows mutual authentication processing operations during operation checking, debugging and the like in the data processing system of the second embodiment of the present invention.

The following describes operations for mutual authentication processing during operation checking, debugging and the like. Steps that are the same as those shown in FIG. 4 in the first embodiment have the same numbering thereas, and a description thereof is omitted.

(1) to (8) are the same as (1) to (8) in the first embodiment (steps S1 to S8).

(9) The random number generation unit 42 judges whether the switch unit 41 is in the first state or the second state (step S21).

(10) When the switch unit 41 is in the second state, the random number generation unit 42 generates a random number for device authentication, and subsequently performs normal operations (step S22).

(11) When the switch unit 41 is in the first state, the random number generation unit 42 generates a random number B (R_b) (step S23).

(12) to (18) are the same as (10) to (16) in the first embodiment (steps S10 to S16).

<Conclusion>

As described, according to the second embodiment of the present invention, by switching the switch the information recording medium 40 can be used for either operation checking, debugging and the like during development of various types of software, or for normal operations.

Third Embodiment

<Outline>

Similar to the first embodiment, in system in the third embodiment of the present invention the personal computer, instead of having a program for performing encryption processing in mutual authentication, stores fixed authentication data and encrypted data that has been generated by encrypting the mutual authentication data, and uses this data each time mutual authentication processing is performed. In addition to the features of the first embodiment, in the third embodiment the memory card counts and stores the number of times that it performs mutual authentication processing, and the number of times that the memory card is used is restricted.

<Structure>

Figure 7:
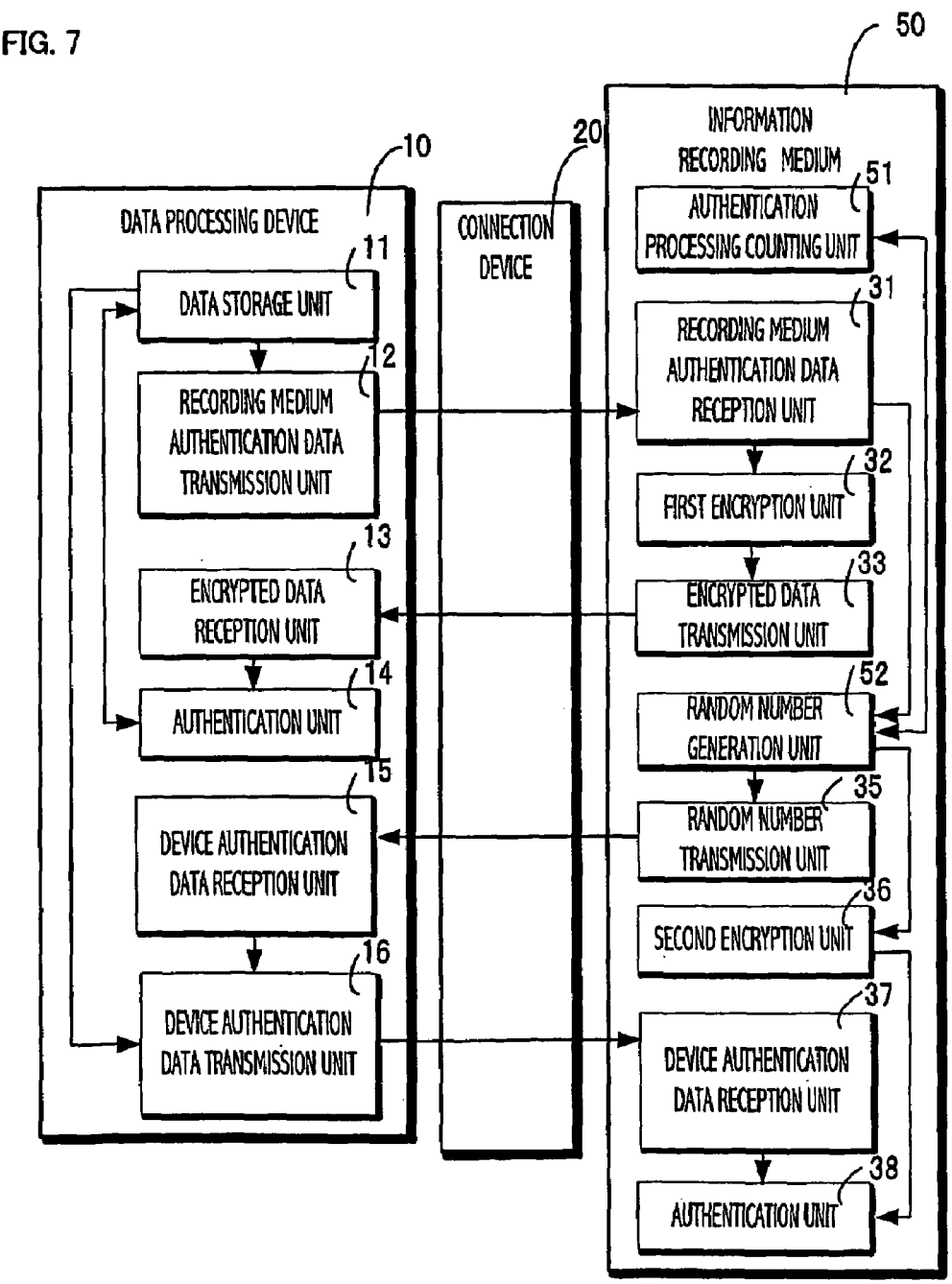
FIG. 7 shows an outline of a data processing system of a third embodiment of the present invention.

FIG. 7 shows an outline of the data processing system of the third embodiment of the present invention. The constitutional elements that are the same as those in the first embodiment have the same numbering thereas, and a description thereof is omitted.

The data processing system shown in FIG. 7 includes the data processing device 10, the connection device 20, and an information recording medium 50.

The information recording medium 50 is, for example, an SD memory card, and includes a semiconductor memory and a CPU. The information recording medium 50 is an intelligent memory card that includes a rights protection function that permits data transmission between the semiconductor memory and an external device on the condition that mutual authentication processing is established. The information recording medium 50 includes the medium authentication data reception unit 31, the first encryption unit 32, the encrypted data transmission unit 33, a random number generation unit 52, the random number transmission unit 35, the second encryption unit 36, the device authentication data reception unit 37, the authentication unit 38 and an authentication processing count unit 51.

The authentication processing count unit 51 stores the number of times that mutual authentication processing has been executed (hereinafter "pseudo-execution count") in operation checking, debugging and the like during development of software.

The random number generation unit 52 generates a random number for device authentication each time the information recording medium 50 is mounted in the connection device 20, before data is transmitted, and each time first medium authentication data is transmitted by the medium authentication data reception unit 31.

Furthermore, each time a random number A (R_a) is received by the medium authentication data reception unit 31 as first medium authentication data, and each time special command data is transmitted from the data processing device 10 according to the user inputting predetermined content into the data processing device 10, the random number generation unit 52 judges whether the pseudo-execution count stored by the authentication processing count unit 51 has reached a predetermined number. When the predetermined number has been reached, the system informs the user that the predetermined number for mutual authentication processing in operation checking, debugging and the like during development of various types of software has been reached, and ends the processing. When the predetermined number has not been reached, the random number generation unit 52 generates a predetermined initial value as a random number seed, uses the seed to generate a pseudo-random number which it supplies as a random number B (R_b), and updates the pseudo-execution count in the authentication processing count unit 51.

Note that the pseudo-execution count stored in the authentication processing count unit 51 may be used without being reset until reaching the predetermined number. Alternatively, the pseudo-execution count may be reset at a predetermined time, such as when the information recording medium 50 is mounted in the connection device 20, or may be reset according to special command data transmitted from the data processing device 10.

Suppose, for example, that the pseudo-execution count is to be reset each time the information recording medium is mounted in the connection device or every time a file is accessed, and pseudo-execution is counted each time a data of one to two kilobytes is accessed. Here the predetermined number in the random number generation unit 52 needs to be at least 6 in order to include issuing of one write command in write processing and one read command in read processing for each of the head part, the intermediate part and the end part of the area for which operation checking, debugging and the like is performed. However, realistically it is appropriate to set the predetermined number to several tens of times, and preferably to a number that is less than the number of times necessary for mutual authentication for normal use of music data.

<Operations>

Figure 8:
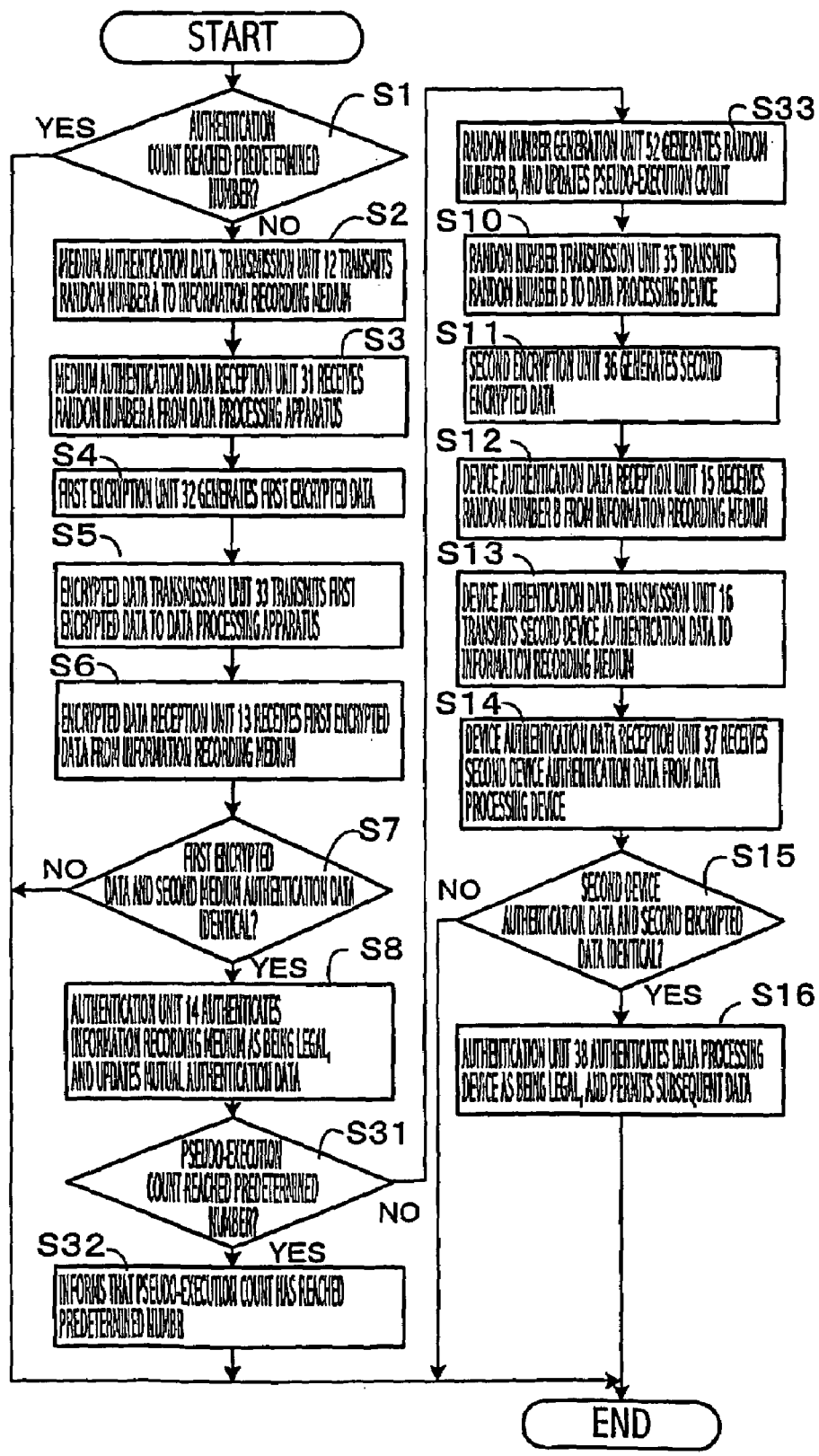
FIG. 8 shows operations for mutual authentication processing during operation checking, debugging and the like in the data processing system of the third embodiment of the present invention.

FIG. 8 shows mutual authentication processing operations in the data processing system of the third embodiment of the present invention during operation checking, debugging and the like.

The following describes operations for mutual authentication processing during operation checking, debugging and the like. Steps that are the same as those shown in FIG. 4 in the first embodiment have the same numbering thereas, and a description thereof is omitted.

(1) to (8) are the same as (1) to (8) in the first embodiment (steps S1 to S8).

(9) The random number generation unit 52 judges whether the pseudo-execution count in the authentication processing count unit 51 has reached the predetermined number (step S31).

(10) When the predetermined number has been reached, the system informs the user that the predetermined number has been reached, and ends the processing (step S32).

(11) When the predetermined number has not been reached, the random number generation unit 52 generates a random number B (R_b), and updates the pseudo-execution count in the authentication processing count unit 51 (step S33).

(12) to (18) are the same as (10) to (16) in the first embodiment (steps S10 to S16).

<Conclusion>

As has been described, according to the third embodiment of the present invention, the information recording medium 50 has a pseudo-execution count, and ends the processing when a predetermined number has been reached. Therefore, by setting the predetermined number to a relatively small number, the recording medium can prevent larger amounts of data being put into general, illegitimate use when the information recording medium is in a state for operation checking, debugging and the like.

Fourth Embodiment

<Outline>

Similar to the first embodiment, in the system in the fourth embodiment of the present invention the personal computer, instead of having a program for performing encryption processing in mutual authentication, stores fixed authentication data and encrypted data that has been generated by encrypting the mutual authentication data, and uses this data each time mutual authentication processing is performed. In addition to the features of the first embodiment, in the fourth embodiment the number of times that mutual authentication processing is performed (pseudo-execution count) is counted by the memory card, and the number of times that the memory card is used is restricted. Furthermore, the memory card includes a switch, and by switching the switch, the user is able to use the memory card for either operation checking, debugging and the like during development of various types of software, or for normal operations.

<Structure>

Figure 9:
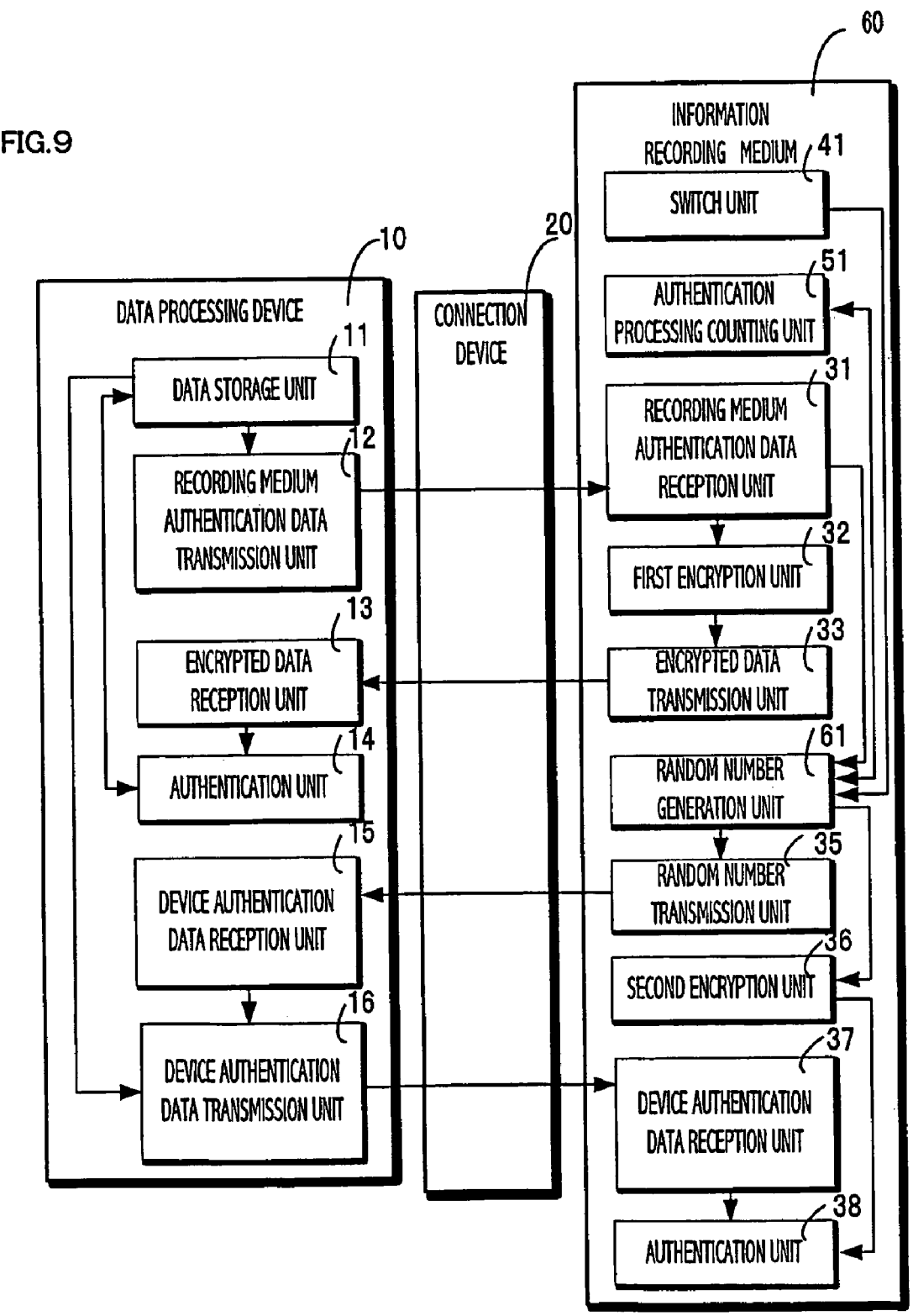
FIG. 9 shows an outline of a data processing system of a fourth embodiment of the present invention.

FIG. 9 shows an outline of the data processing system of the fourth embodiment of the present invention. The constitutional elements that are the same as those in the first, second and third embodiments have the same numbering thereas, and a description thereof is omitted.

The data processing system shown in FIG. 9 includes the data processing device 10, the connection device 20, and an information recording medium 60.

The information recording medium 60 is, for example, an SD memory card, and includes a semiconductor memory and a CPU. The information recording medium 60 is an intelligent memory card that includes a rights protection function that permits data transmission between the semiconductor memory and an external device on the condition that mutual authentication processing is established. The information recording medium 60 includes the recording medium authentication data reception unit 31, the first encryption unit 32, the encrypted data transmission unit 33, a random number generation unit 61, the random number transmission unit 35, the second encryption unit 36, the device authentication data reception unit 37, the authentication unit 38, the switch unit 41 and the authentication processing count unit 51.

Each time first medium authentication data is received from the medium authentication data reception unit 31 when the switch unit 41 is in the first state, the random number generation unit 61 judges whether the pseudo-execution count in the authentication processing count unit 51 has reached the predetermined number. When the predetermined number has been reached, the system informs the user that the predetermined number for mutual authentication processing in operation checking, debugging and the like during development of various types of software has been reached, and ends the processing. When the predetermined number has not been reached, the random number generation unit 61 generates a predetermined initial value as a random number seed, uses the seed to generate a pseudo-random number which it supplies as a random number B (R_b), and updates the pseudo-execution count in the authentication processing count unit 51. When the switch unit 41 is in the second state, the random number generation unit 61 generates a random number for device authentication each time the information recording medium 60 is mounted in the connection device 20, before data is transmitted, and each time first medium authentication data is transmitted by the medium authentication data reception unit 31.

<Operations>

Figure 10:
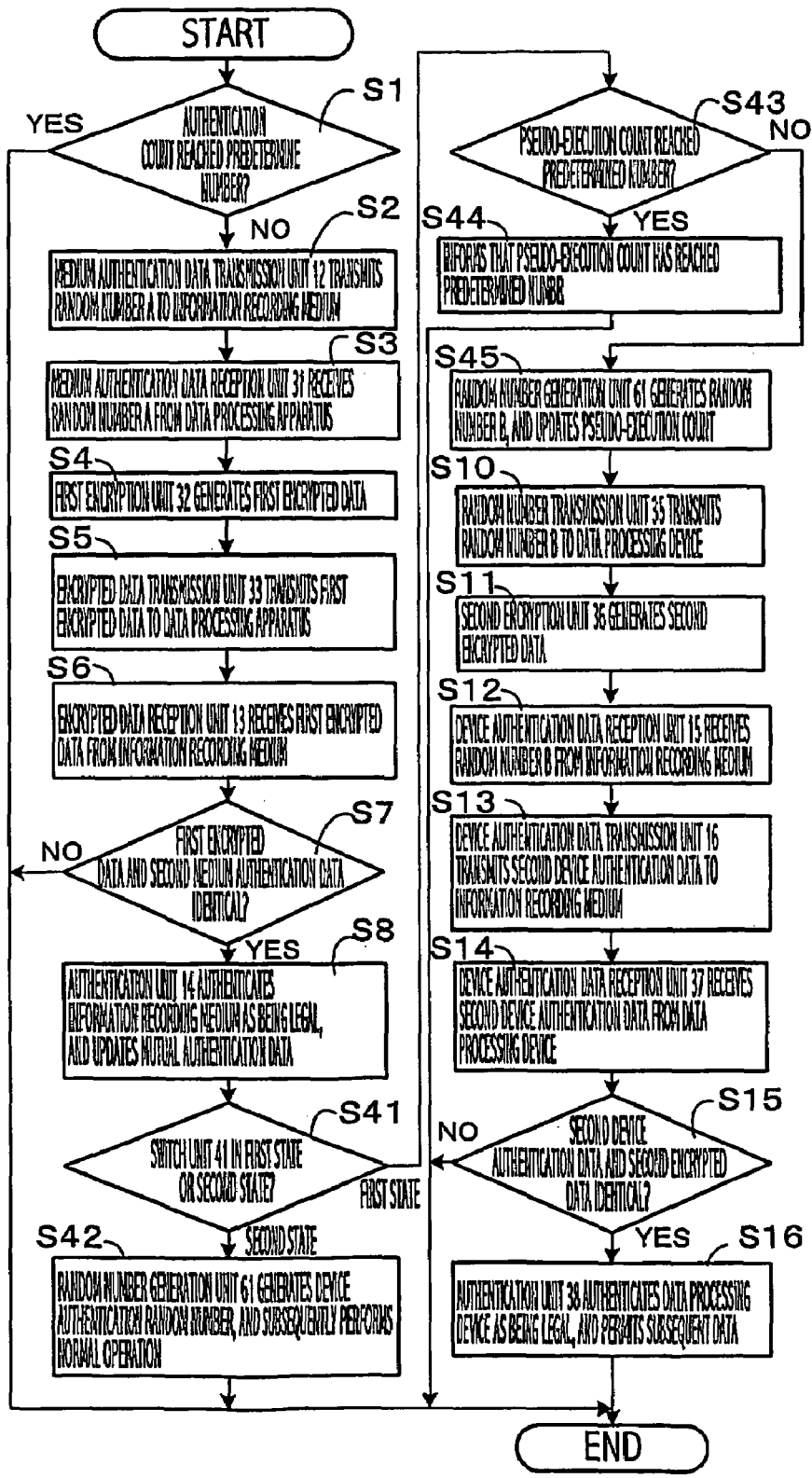
FIG. 10 shows operations for mutual authentication processing during operation checking, debugging and the like in the data processing system of the fourth embodiment of the present invention.

FIG. 10 shows mutual authentication processing operations in the data processing system of the fourth embodiment of the present invention in operation checking, debugging and the like.

The following describes operations for mutual authentication processing in operation checking, debugging and the like. Steps that are the same as those shown in FIG. 4 in the first embodiment have the same numbering thereas, and a description thereof is omitted.

(1) to (8) are the same as (1) to (8) in the first embodiment (steps S1 to S8).

(9) The random number generation unit 61 judges whether the switch unit 41 is in the first state or the second state (step S41).

(10) When the switch unit 41 is in the second state, the random number generation unit 61 generates a random number for use in device authentication, and subsequently performs normal operations (step S42).

(11) When the switch unit 41 is in the first state, the random number generation unit 61 judges whether the pseudo-execution count has reached the predetermined number or not (step S43)

(12) When the predetermined number has been reached, the system informs the user that the predetermined number has been reached, and ends the processing (step S44)

(13) When the predetermined number has not been reached, the random number generation unit 61 generates a random number B (R_b), and updates the pseudo-execution count in the authentication processing count unit 51 (step S45).

(14) to (20) are the same as (10) to (16) in the first embodiment (steps S10 to S16).

<Conclusion>

As described, according to the fourth embodiment of the present invention, by switching the switch the information recording medium 60 can be used for either operation checking, debugging and the like during development of various types of software, or for normal operations. Furthermore, the information recording medium 50 ends the processing when a predetermined the pseudo-execution count reaches the predetermined number. Therefore, the recording medium can prevent larger amounts of data being put into general, illegitimate use when the information recording medium is in a state for operation checking, debugging and the like.

Fifth Embodiment

<Outline>

In the system in the fifth embodiment of the present invention use of data is only permitted when the personal computer and the information recording medium authenticate each other as being legitimate by performing mutual authentication processing. Here, the personal computer and the memory card, instead of having programs for performing encryption processing in mutual authentication, store fixed authentication data and encrypted data that has been generated by encrypting the mutual authentication data, and use this data each time mutual authentication processing is performed.

<Structure>

Figure 11:
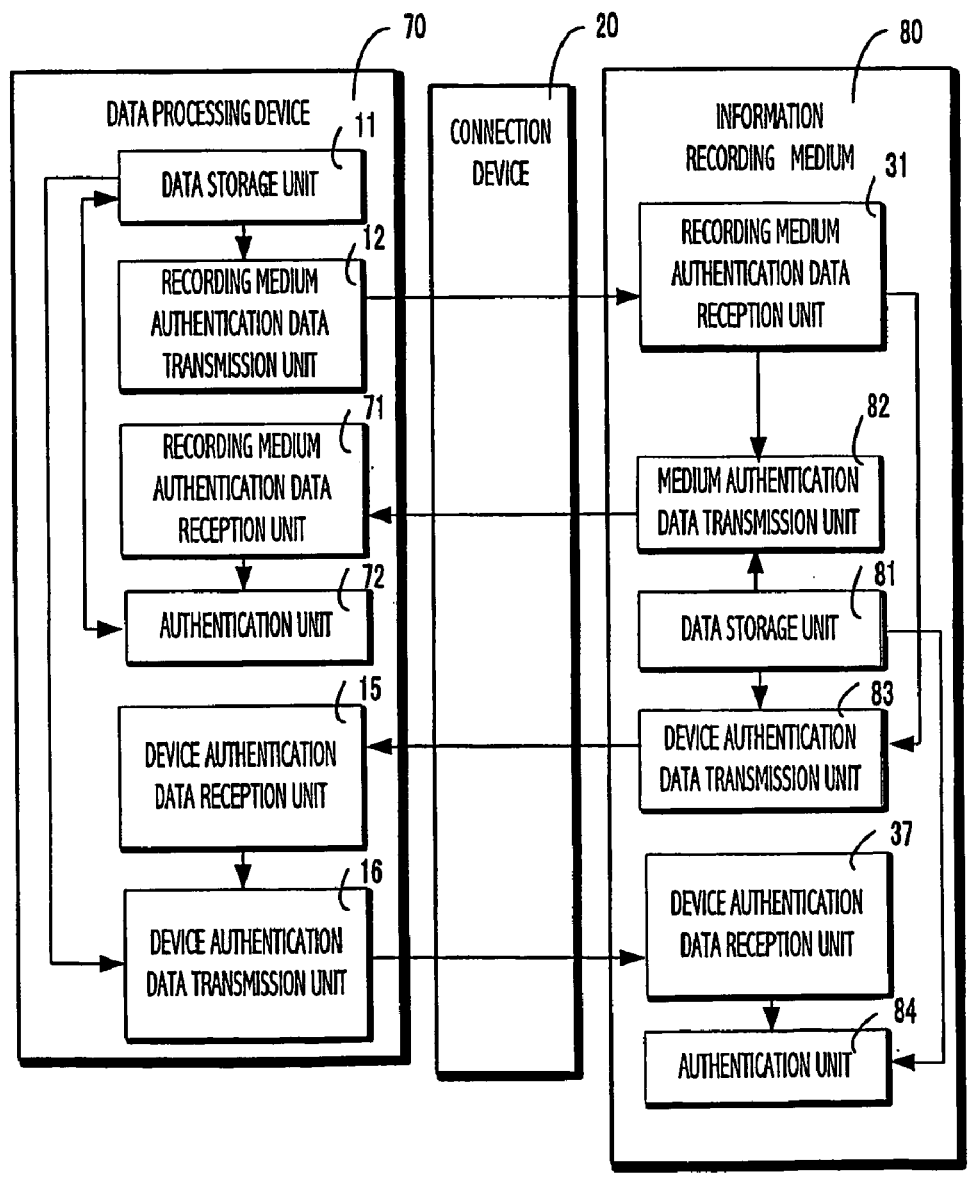
FIG. 11 shows an outline of a data processing system of a fifth embodiment of the present invention.

FIG. 11 shows an outline of the data processing system of the fifth embodiment of the present invention. The constitutional elements that are the same as those in the first, embodiment have the same numbering thereas, and a description thereof is omitted.

The data processing system shown in FIG. 11 includes a data processing device 70, the connection device 20 and an information recording medium 80.

The data processing device 70 is, for example, a general-purpose computer such as a personal computer that executes software for checking operations, and includes the data storage unit 11, the medium authentication data transmission unit 12, a medium authentication data reception unit 71, an authentication unit 72, the device authentication data reception unit 15 and the device authentication data transmission unit 16.

The medium authentication data reception unit 71 is, for example, software in the personal computer such as a driver. The authentication unit 72 is, for example, application software that operates in the personal computer.

The information recording medium 80 is, for example, an SD memory card, and includes a semiconductor memory and a CPU. The information recording medium 80 is an intelligent memory card that includes a rights protection function that permits data transmission between the semiconductor memory and an external device on the condition that mutual authentication processing succeeds. The information recording medium 80 includes the recording medium authentication data reception unit 31, a data storage unit 81, a medium authentication data transmission unit 82, a device authentication data transmission unit 83, the device authentication data reception unit 37 and an authentication unit 84.

The medium authentication data reception unit 71 receives third medium authentication data (V"2) from the information recording medium 80.

The authentication unit 72 performs comparison processing (C_a) to compare the third medium authentication data (V"2) received by the medium authentication data reception unit 71 and the second medium authentication data (V'2) stored in the data storage area 11 and judge whether the two pieces of data are identical or not. When the two pieces of data are identical, the authentication unit 72 authenticates the information recording medium 80 as being legitimate. When the two pieces of data are not identical, the authentication unit 72 does not authenticate the information recording medium 80 as being legitimate, and the system informs the user that mutual device authentication failed, where the mutual authentication failed, and other information, then ends the processing.

The data storage unit 81 stores the third medium authentication data (V"2) that has been generated by applying predetermined encryption processing to first medium authentication data, first device authentication data, and third device authentication data (V"1) that has been generated by applying the predetermined encryption processing to the first device authentication data.

The first medium authentication data and the first device authentication data are each, for example, a 56 bit or a 64 bit random number. The predetermined encryption processing converts the 56 bit or 64 bit data to different 64 bit data. Since it is necessary to use a conversion method that cannot be analyzed from the original data and the data that results from conversion, an F function used in the DES decryption method is preferable because it is not reversible. Here, the first medium authentication data for operation checking, debugging and the like is referred to as random number A (R_a), and the first device authentication data for operation checking, debugging and the like is referred to as random number B (R_b).

On the medium authentication data reception unit 31 receiving a random number A (R_a) as first medium authentication data, the medium authentication data transmission unit 82 transmits the third medium authentication data (V"2) stored in the data storage unit 81 to the data processing device 70.

Each time a random number A (R_a) is received by the medium authentication data reception unit 31 as first medium authentication data, and on special command data being received from the data processing device according to the user inputting predetermined content into the data processing device 70, the device authentication data transmission unit 83 transmits the random number B (R_b) stored in the data storage unit 81 to the data processing device 70 as first device authentication data.

The authentication unit 84 uses comparison processing (C_b) to compare the second device authentication data (V1) received from the device authentication data reception unit 37 and the third device authentication data (V"1) stored in the data storage unit 81 and judge whether the two pieces of data are identical or not. When the two pieces of data are identical, the authentication unit 84 authenticates the data processing device 70 as being authentic, and permits subsequent use of data.

<Operations>

Figure 12:
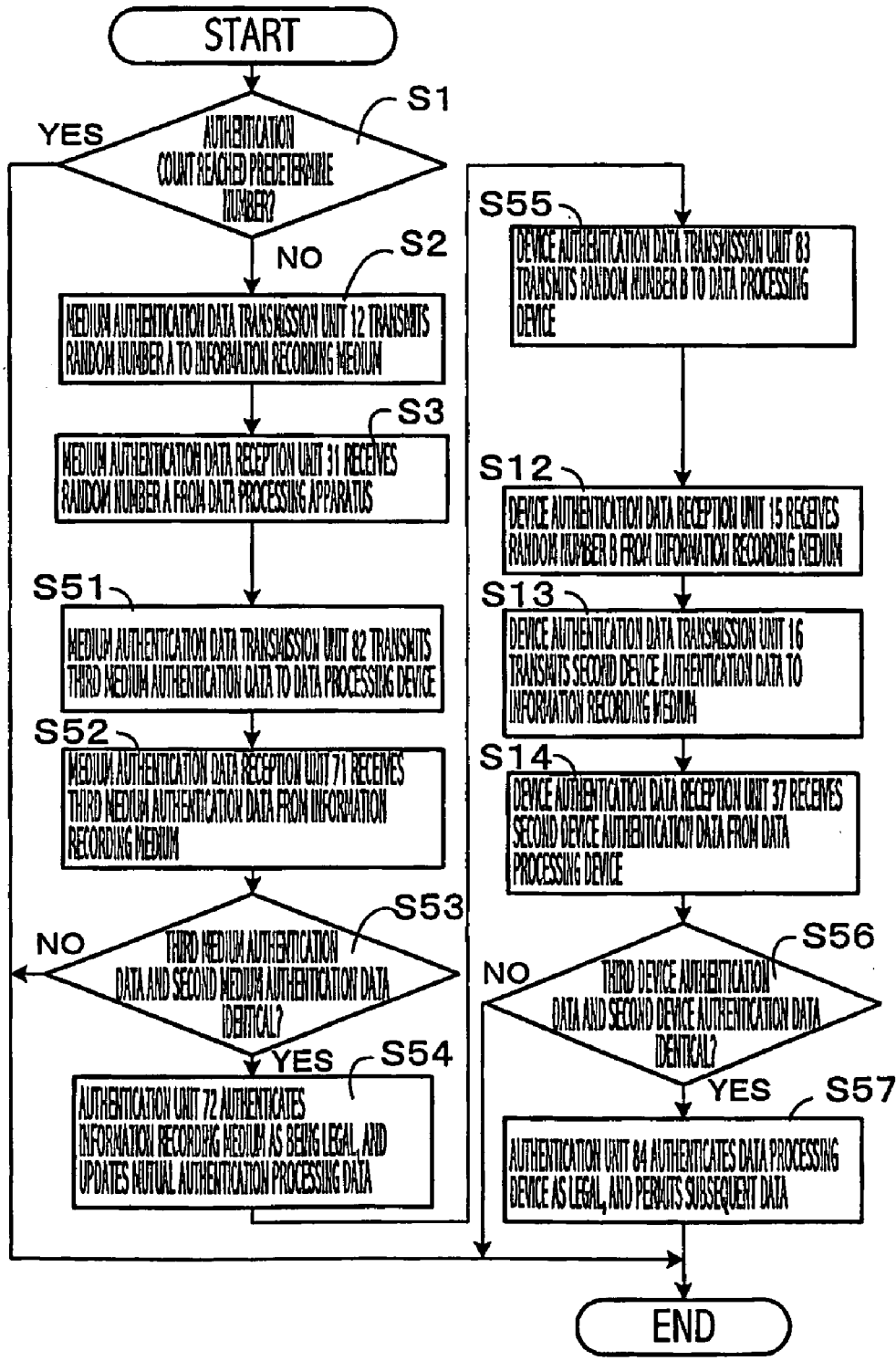
FIG. 12 shows operations for mutual authentication processing during operation checking, debugging and the like in the data processing system of the fifth embodiment of the present invention.

FIG. 12 shows the operations for mutual authentication processing during operation checking, debugging and the like, in the data processing system fifth embodiment of the present invention.

The following describes operations for mutual authentication processing during operation checking, debugging and the like. Steps that are the same as those shown in FIG. 4 in the first embodiment have the same numbering thereas, and a description thereof is omitted.

(1) to (3) are the same as (1) to (3) in the first embodiment (steps S1 to S3).

(4) The medium authentication data transmission unit 82 transmits the third medium authentication data (V"2) stored in the data storage unit 81 to the data processing device (step S51).

(5) The medium authentication data reception unit 71 receives the third medium authentication data (V"2) from the information recording medium (step S52).

(6) The authentication unit 72 compares the third medium authentication data (V"2) received by the medium authentication data reception unit 71 and the second medium authentication data stored in the data storage unit 11, and judges whether the two pieces of data are identical. When the two pieces of data are not identical, the system informs the user that mutual authentication processing failed, where the mutual authentication failed, and other information, then ends mutual authentication processing (step S53).

(7) When the two pieces of data are identical, the authentication unit 72 authenticates the information recording medium as being legitimate, and updates data stored in the storage unit 81, such as the pseudo-execution count and the mutual authentication processing result (step S54).

(8) The device authentication data transmission unit 83 transmits the random number B (R_b) stored in the data storage unit 81 to the data processing device (step S55).

(9) to (11) are the same as (12) to (14) in the first embodiment (steps S12 to S14).

(12) The authentication unit 84 compares the second device authentication data (V1) received by the device authentication data reception unit 37 and the third device authentication data (V"1) stored in the data storage unit 81, and judges whether the two pieces of data are identical. When the two pieces of data are not identical, the system informs the user that mutual authentication processing failed, where the mutual authentication failed, and other information, then ends mutual authentication processing (step S56).

(13) When the two pieces of data are identical, the authentication unit 84 authenticates the data processing device a being legitimate, and permits subsequent data use (step S57).

<Conclusion>

As described, in the data processing system of the fifth embodiment during operation checking, debugging and the like in development of various types of software, mutual authentication processing is performed using the same data each time, in other words, using the fixed authentication data and encrypted data stored by the data processing device, and using the fixed authentication data and encrypted data stored by the information recording medium 80. Therefore, developers of various types of software are able to check data transfer operations without risk of secret information being leaked.

Sixth Embodiment

<Outline>

Similar to the fifth embodiment, in the sixth embodiment the personal computer and the memory card, instead of having programs for performing encryption processing in mutual authentication, both store fixed authentication data and encrypted data that has been generated by encrypting the authentication data, and use this data each time mutual authentication processing is performed. In addition, the information recording medium stores a mutual authentication processing count, and restricts the number of times that the recording medium is used.

<Structure>

Figure 13:
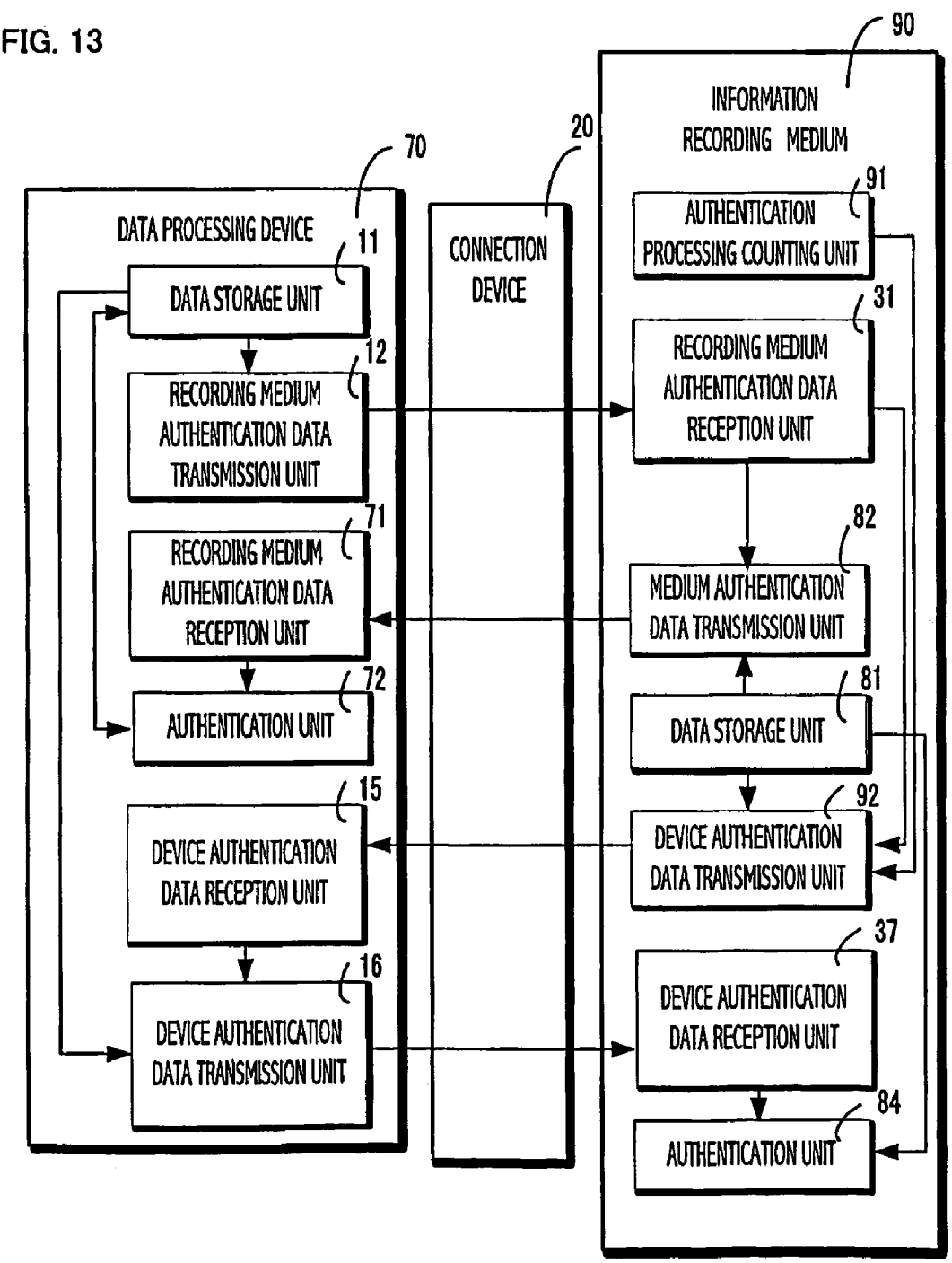
FIG. 13 shows an outline of a data processing system of a sixth embodiment of the present invention.

FIG. 13 shows an outline of the data processing system of the sixth embodiment of the present invention. The constitutional elements that are the same as those in the first embodiment have the same numbering thereas, and a description thereof is omitted.

The data processing system shown in FIG. 13 includes the data processing device 70, the connection device 20 and an information recording medium 90.

The information recording medium 90 is, for example, an SD memory card, and includes a semiconductor memory and a CPU. The information recording medium 90 is an intelligent memory card that includes a rights protection function that permits data transmission between the semiconductor memory and an external device on the condition that mutual authentication processing is established. The information recording medium 90 includes the medium authentication data reception unit 31, the data storage unit 81, the medium authentication data transmission unit 82, a device authentication data transmission unit 92, the device authentication data reception unit 37, the authentication unit 84 and an authentication processing count unit 91.

The authentication processing count unit 91 stores the pseudo-execution count for operation checking, debugging and the like during development of various types software.

Each time a random number A (R_a) is received by the medium authentication data reception unit 31 as first medium authentication data, and each time special command data is transmitted from the data processing device 70 according to the user inputting predetermined content into the data processing device 70, the device authentication data transmission unit 92 judges whether the pseudo-execution count stored by the authentication processing count unit 91 has reached a predetermined number. When the predetermined number has been reached, the system informs the user that the predetermined number for mutual authentication processing in operation checking, debugging and the like during development of various types of software has been reached, and ends the processing. When the predetermined number has not been reached, the device authentication data transmission unit 92 transmits the first device authentication data stored in the data storage unit 81 to the data processing device 70, and updates the pseudo-execution count in the authentication processing count unit 91.

Note that the pseudo-execution count stored in the authentication processing count unit 91 may be used without being reset until reaching the predetermined number. Alternatively, the pseudo-execution count may be reset at a predetermined time, such as when an information recording medium is mounted in the connection device 20, or may be reset according to particular command data transmitted from the data processing device.

For example, suppose that the pseudo-execution count is to be reset each time the information recording medium is mounted in the connection device or every time a file is accessed, and pseudo-execution is counted each time a data of one to two kilobytes is accessed. Here the predetermined number in the device authentication data transmission unit 92 needs to be at least 6 in order to include issuing of one write command in write processing and one read command in read processing for each of the head part, the intermediate part and the end part of the area for which operation checking, debugging and the like is to be performed. However, realistically it is appropriate to set the predetermined number to several tens of times, and preferably to a number that is less than the number of times necessary for mutual authentication for normal use of music data.

<Operations>

Figure 14:
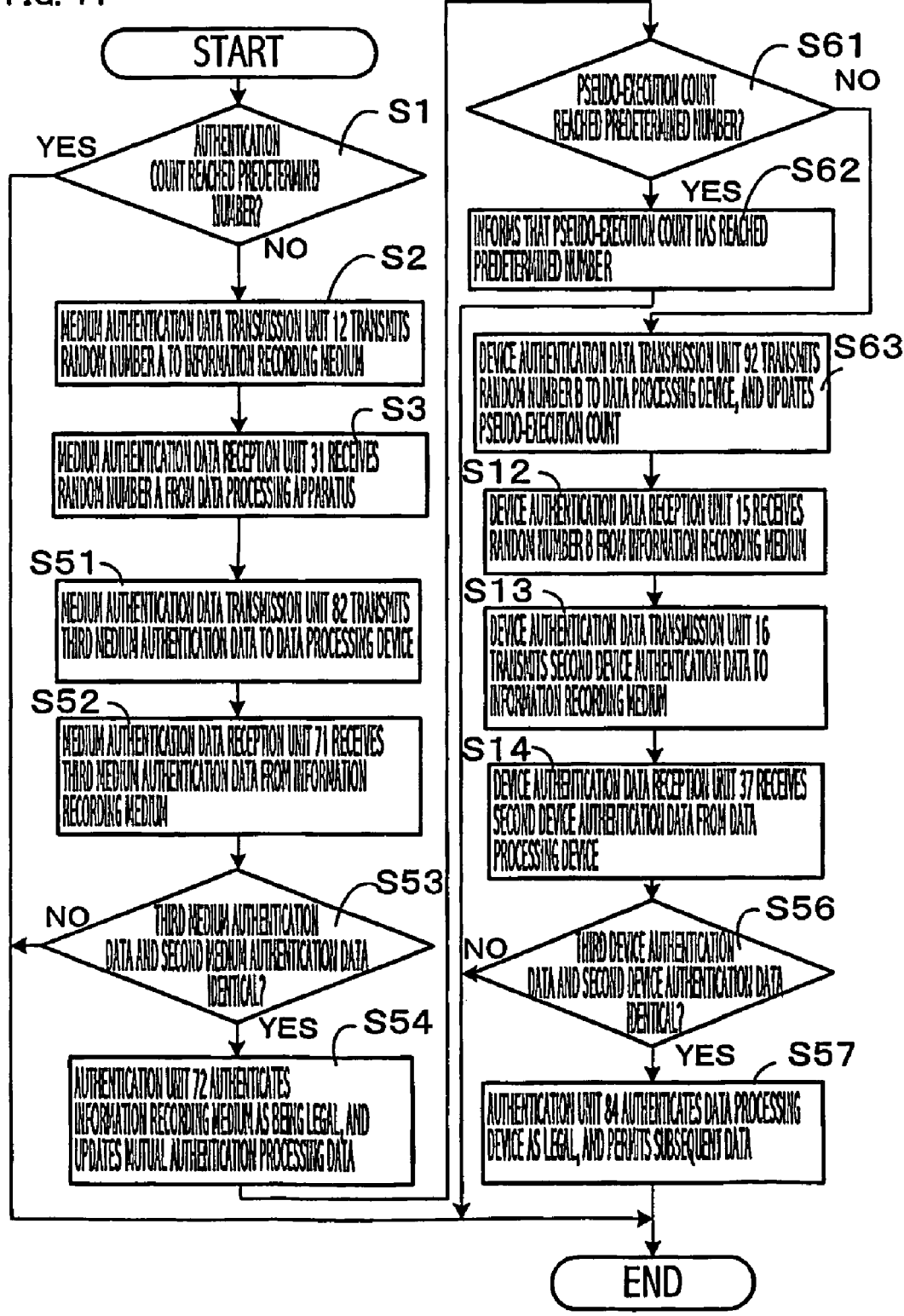
FIG. 14 shows operations for mutual authentication processing during operation checking, debugging and the like in the data processing system of the sixth embodiment of the present invention.

FIG. 14 shows mutual authentication processing operations in the data processing system of the sixth embodiment of the present invention during operation checking, debugging and the like.

The following describes operations for mutual authentication processing during operation checking, debugging and the like. Steps that are the same as those shown in FIG. 12 in the fifth embodiment have the same numbering thereas, and a description thereof is omitted.

(1) to (7) are the same as (1) to (7) in the fifth embodiment (steps S51 to S54).

(8) The device authentication data transmission unit 92 judges whether the pseudo-execution count in the authentication processing count unit 91 has reached the predetermined number or not (step S61).

(9) When the predetermined number has been reached, the system informs the user that the predetermined number has been reached, and ends the processing (step S62).

(10) When the predetermined number has not been reached, the device authentication data transmission unit 92 transmits the first device authentication data stored in the data storage unit 81 to the data processing device, and updates the pseudo-execution count in the authentication processing count unit 91 (step S63).

(11) to (15) are the same as (9) to (13) in the fifth embodiment (steps S12 to S14, S56 and S57).

<Conclusion>

As has been described, according to the sixth embodiment of the present invention, the information recording medium 90 has a pseudo-execution count, and ends the processing when the count has reached a predetermined number. Therefore, the recording medium can prevent larger amounts of data being put into illegal, general use when the information recording medium is in a state for operation checking, debugging and the like, by setting the predetermined number to a relatively small number.

MODIFICATIONS

The following are possible modifications to the first to sixth embodiments.

The random number A may be a pseudo-random number generated by using a predetermined initial value as the seed. Here, instead of storing the random number A, the data storage unit 11 may pre-store a predetermined initial value which is used as the seed to generate a pseudo-random number, and the generated pseudo-random number provided as the random number A.

The random number B may be a predetermined random number, and instead of the random number generation unit generating a random number B (R_b), a predetermined random number B (R_b) may be stored in advance and provided as the random number B.

A plurality of random numbers A and random numbers B may be provided in advance and the random number A and the random number B selected from amongst the respective pluralities according to an authentication processing start command or special command data. Alternatively, sequential numbers such as 1, 2, 3, 4, 5, . . . , 56 may be used instead of random numbers, or numbers that are specified according to an authentication processing start command or a particular command may be used.

The user may input a password into the data processing device 10, and the mutual authentication processing operations for operation checking, debugging and the like started only when the password is correct.

Any of the embodiments of the present invention may be combined.

Note that a program that has a computer execute operations of any of the embodiments of the present invention may traded by being recorded on a computer-readable recording medium and the recording medium distributed, or by being directly transfer over a network.

Here, the computer-readable recording medium is not limited to being a particular type of recording medium, and may be for example a detachable recording medium such as floppy disk, a CD, an MO (magneto-optical), a DVD (digital versatile disk) or a memory card, or a fixed recording medium such as a hard disk or a semiconductor memory.

INDUSTRIAL APPLICABILITY

The present invention can be used by developers of various types of software for a memory card that performs mutual authentication processing, when checking data transfer, debugging and the like. According to the present invention, developers can perform operation checking, debugging and so on of data transfer while guarding secret information thoroughly, and without mutual authentication software having to be distributed. This reduces limitations on developers, and means that the present invention can be can be widely used by developers.

The invention claimed is:

1. A data processing system that includes a data processing device and a recording medium that perform mutual authentication, and permits transfer of useful data only when the data processing device and the recording medium authenticate each other as being legitimate, the data processing device comprising:

a medium authentication data storage unit operable to store first medium authentication data, and second medium authentication data generated by applying a predetermined encryption to the first medium authentication data;

a medium authentication data transmission unit operable to transmit the first medium authentication data to the recording medium;

an encrypted data reception unit operable to receive first encrypted data that has been generated by the recording medium by applying an encryption included in the recording medium to the transmitted first medium authentication data;

a medium authentication unit operable to judge whether the received first encrypted data and the stored second medium authentication data are identical, and when the judgement is positive, authenticate the recording medium as being legitimate;

a first device authentication data reception unit operable to receive first device authentication data from the recording medium;

a device authentication data storage unit operable to store second device authentication data generated by applying the predetermined encryption to the first device authentication data; and a second device authentication data transmission unit operable, when the first device authentication data reception unit receives the first device authentication data, to transmit the stored second device authentication data to the recording medium, and the recording medium comprising:

a medium authentication data reception unit operable to receive the first medium authentication data from the data processing device;

a first encryption unit operable to generate the first encrypted data by applying the encryption included in the recording medium to the received first medium authentication data;

an encrypted data transmission unit operable to transmit the generated first encrypted data to the data processing device;

a device authentication data output unit operable to output the first device authentication data;

a first device authentication data transmission unit operable to transmit the output first device authentication data to the data processing device;

a second encryption unit operable to generate second encrypted data by applying the encryption to the output first device authentication data;

a second device authentication data reception unit operable to receive the second device authentication data from the data processing device; and a device authentication unit operable to judge whether the received second device authentication data and the generated second encrypted data are identical, and when the judgement is positive, authenticate the data processing device as being legitimate.

2. The data processing system of claim 1, wherein the recording medium further comprises:

a counting unit operable to store a number of times that mutual authentication processing has been executed; and a usage count restriction unit operable to judge whether the number stored by the counting unit has reached a predetermined number, and, when the judgement is positive, stop mutual authentication processing and prohibit transfer of the useful data, and when the judgement is negative, have the mutual authentication processing continue.

3. The data processing system of claim 2, wherein the recording medium is portable and is mounted in the data processing device by a user, and the counting unit resets the number each time the recording medium is mounted in the data processing device.

4. The data processing system of claim 2, wherein the counting unit resets the number each time predetermined data is received from the data processing device.

5. The data processing system of claim 1, wherein the recording medium is portable and is mounted in the data processing device by a user, and the device authentication data output unit outputs predetermined data as the first device authentication data each time the recording medium is mounted in the data processing device.

6. The data processing system of claim 5, wherein
the predetermined data is one of (a) a pseudo-random number that is generated using a predetermined initial value as a seed, (b) a predetermined random number, (c) a random number selected according to command data from the data processing device, (d) a number designated according to command data from the data processing device, and (e) a sequential number.

7. The data processing system of claim 1, wherein
the recording medium further comprises:
a switch unit that is set to either a first state or a second state by a user, and
the device authentication data output unit, when the switch unit is in the first state, outputs predetermined data as the first device authentication data, and when the switch unit is in the second state, outputs a random number each time as the first device authentication data, the random number being different each time.

8. The data processing system of claim 7, wherein
the predetermined data is one of (a) a pseudo-random number that is generated using a predetermined initial value as a seed, (b) a predetermined random number, (c) a random number selected according to command data from the data processing device, (d) a number designated according to command data from the data processing device, and (e) a sequential number.

9. The data processing system of claim 1, wherein
the device authentication data output unit outputs predetermined data as the first device authentication data each time predetermined data is received from the data processing device.

10. The data processing system of claim 9, wherein
the predetermined data is one of (a) a pseudo-random number that is generated using a predetermined initial value as a seed, (b) a predetermined random number, (c) a random number selected according to command data from the data processing device, (d) a number designated according to command data from the data processing device, and (e) a sequential number.

11. A data processing system that includes a data processing device and a recording medium that perform mutual authentication, and permits transfer of useful data only when the data processing device and the recording medium authenticate each other as being legitimate,
the data processing device comprising:
a first medium authentication data storage unit operable to store first medium authentication data, and second medium authentication data generated by applying a predetermined encryption to the first medium authentication data;
a first medium authentication data transmission unit operable to transmit the first medium authentication data to the recording medium;
a first medium authentication data reception unit operable to receive third medium authentication data generated by applying a predetermined encryption to the first medium authentication data from the recording medium;
a medium authentication unit operable to judge whether the received third medium authentication data and the stored second medium authentication data are identical, and when the judgement is positive, authenticate the recording medium as being legitimate;
a first device authentication data reception unit operable to receive first device authentication data from the recording medium;
a first device authentication data storage unit operable to store second device authentication data generated by applying the predetermined encryption to the first device authentication data; and
a second device authentication data transmission unit operable, when the first device authentication data reception unit receives the first device authentication data, to transmit the second device authentication data to the recording medium, and
the recording medium comprising:
a second medium authentication data reception unit operable to receive the first medium authentication data from the data processing device;
a second medium authentication data storage unit operable to store the third authentication data;
a second medium authentication data transmission unit operable, when the second medium authentication data reception unit receives the first medium authentication data, to transmit the third medium authentication data to the data processing device;
a second device authentication data storage unit operable to store the first device authentication data, and third device authentication data that has been generated by applying the predetermined encryption to the first device authentication data;
a first device authentication data transmission unit operable to transmit the stored first device authentication data to the data processing device;
a second device authentication data reception unit operable to receive the second device authentication data from the data processing device; and
a device authentication unit operable to judge whether the received second device authentication data and the stored third device authentication data are identical, and when the judgement is positive, authenticate the data processing device as being legitimate.

12. The data processing system of claim 11, wherein
the recording medium further comprises:
a counting unit operable to store a number of times that mutual authentication processing has been executed; and
a usage count restriction unit operable to judge whether the number stored by the counting unit has reached a predetermined number, and, when the judgement is positive, stop mutual authentication processing and prohibit transfer of the useful data, and when the judgement is negative, have the mutual authentication processing continue.

13. The data processing system of claim 12, wherein
the recording medium is portable and is mounted in the data processing device by a user, and
the counting unit resets the number each time the recording medium is mounted in the data processing device.

14. The data processing system of claim 12, wherein
the counting unit resets the number each time predetermined data is received from the data processing device.

15. The data processing system of claim 11, wherein
the recording medium is portable and is mounted in the data processing device by a user, and
the first device authentication data transmission unit transmits the stored first device authentication data to the data processing device each time the recording medium is mounted in the data processing device.

16. The data processing system of claim 15, wherein the stored first device authentication data is one of (a) a pseudo-random number that is generated using a predetermined initial value as a seed, (b) a predetermined random number, (c) a random number selected according to command data from the data processing device, (d) a number designated according to command data from the data processing device, and (e) a sequential number.

17. A data processing method that performs mutual authentication between a data processing device and a recording medium, and permits transfer of useful data only when the data processing device and the recording medium authenticate each other as being legitimate, the data processing device comprising a medium authentication data storage unit operable to store first medium authentication data, and second medium authentication data generated by applying a predetermined encryption to the first medium authentication data; and a device authentication data storage unit operable to store second device authentication data generated by applying the predetermined encryption to first device authentication data, the data processing method comprising:

a medium authentication data transfer step of transferring the first medium authentication data to the recording medium;

a first encryption step of, in the recording medium, generating first encrypted data by applying an encryption included in the recording medium to the transferred first medium authentication data;

an encrypted data transfer step of transferring the generated first encrypted data to the data processing device;

a medium authentication step of, in the data processing device, judging whether the transferred first encrypted data and the stored second medium authentication data are identical, and when the judgement is positive, authenticating the recording medium as being legitimate;

a device authentication data output step of, in the recording medium, outputting the first device authentication data;

a first device authentication data transfer step of transferring the output first device authentication data to the data processing device;

a second encryption step of, in the recording medium, generating second encrypted data by applying the encryption included in the recording medium to the output first device authentication data;

a second device authentication data transfer step of, when the first device authentication data has been transferred by the first device authentication data transfer step, transferring the stored second device authentication data to the recording medium; and a device authentication step of, in the recording medium, judging whether the transferred second device authentication data and the generated second encrypted data are identical, and when the judgement is positive, authenticating the data processing device as being legitimate.

18. A data processing method that performs mutual authentication between a data processing device and a recording medium, and permits transfer of useful data only when the data processing device and the recording medium authenticate each other as being legitimate, the data processing device comprising a first medium authentication data storage unit operable to store first medium authentication data, and second medium authentication data generated by applying a predetermined encryption to the first medium authentication data; and a first device authentication data storage unit operable to store second device authentication data generated by applying the predetermined encryption to first device authentication data, the recording medium comprising a second medium data storage unit operable to store third medium authentication data generated by applying a predetermined encryption to the first medium authentication data; and a second device authentication data storage unit operable to store the first device authentication data, and third device authentication data generated by applying the predetermined encryption to the first device authentication data, the data processing method comprising:

a first medium authentication data transfer step of transferring the stored first medium authentication data to the recording medium;

a second medium authentication data transfer step of, when the first medium authentication data has been transferred, transferring the stored third medium authentication data to the data processing device;

a medium authentication step of, in the data processing device, judging whether the transferred third medium authentication data and the stored second medium authentication data are identical, and when the judgement is positive, authenticating the recording medium as being legitimate;

a first device authentication data transfer step of transferring the stored first device authentication data to the data processing device;

a second device authentication data transfer step of, when the first device authentication data has been transferred, transferring the stored second device authentication data to the recording medium; and a device authentication step of, in the recording medium, judging whether the transferred second device authentication data and the stored third device authentication data are identical, and when the judgement is positive, authenticating the data processing device as being legitimate.

19. A data processing device in a data processing system in which the data processing device and a recording medium perform mutual authentication, the data processing system permitting transfer of useful data only when the data processing device and the recording medium authenticate each other as being legitimate, the data processing device comprising:

a medium authentication data storage unit operable to store first medium authentication data, and second medium authentication data generated by applying a predetermined encryption to the first medium authentication data;

a medium authentication data transmission unit operable to transmit the first medium authentication data to the recording medium;

an encrypted data reception unit operable to receive first encrypted data that has been generated by the recording medium by applying an encryption included in the recording medium to the transmitted first medium authentication data;

a medium authentication unit operable to judge whether the received first encrypted data and the stored second medium authentication data are identical, and when the judgement is positive, authenticate the recording medium as being legitimate;

a first device authentication data reception unit operable to receive first device authentication data from the recording medium;

a device authentication data storage unit operable to store second device authentication data generated by applying the predetermined encryption to the first device authentication data; and a second device authentication data transmission unit operable, when the first device authentication data reception unit receives the first device authentication data, to transmit the stored second device authentication data to the recording medium.

20. A data processing device in a data processing system in which the data processing device and a recording medium perform mutual authentication, the data processing system permitting transfer of useful data only when the data processing device and the recording medium authenticate each other as being legitimate, the data processing device comprising:

a first medium authentication data storage unit operable to store first medium authentication data, and second medium authentication data generated by applying a predetermined encryption to the first medium authentication data;

a first medium authentication data transmission unit operable to transmit the first medium authentication data to the recording medium;

a first medium authentication data reception unit operable to receive third medium authentication data generated by applying a predetermined encryption to the first medium authentication data from the recording medium;

a medium authentication unit operable to judge whether the received third medium authentication data and the stored second medium authentication data are identical, and when the judgement is positive, authenticate the recording medium as being legitimate;

a first device authentication data reception unit operable to receive first device authentication data from the recording medium;

a first device authentication data storage unit operable to store second device authentication data generated by applying the predetermined encryption to the first device authentication data; and a second device authentication data transmission unit operable, when the first device authentication data reception unit receives the first device authentication data, to transmit the second device authentication data to the recording medium.

21. A data processing program that executes in a data processing device a data processing method by which the data processing device and a recording medium perform mutual authentication, the data processing method permitting transfer of useful data only when the data processing device and the recording medium authenticate each other as being legitimate, the data processing device comprising a medium authentication data storage unit operable to store first medium authentication data, and second medium authentication data generated by applying a predetermined encryption to the first medium authentication data; and a device authentication data storage unit operable to store second device authentication data generated by applying the predetermined encryption to first device authentication data, the data processing program comprising:

a medium authentication data transmission step of transmitting the first medium authentication data to the recording medium;

an encrypted data reception step of receiving first encrypted data that has been generated by the recording medium by applying an encryption included in the recording medium to the transmitted first medium authentication data;

a medium authentication step of judging whether the received first encrypted data and the stored second medium authentication data are identical, and when the judgement is positive, authenticating the recording medium as being legitimate;

a first device authentication data reception step of receiving the first device authentication data from the recording medium; and a second device authentication data transmission step of, when the first device authentication data reception unit receives the first device authentication data, transmitting the stored second device authentication data to the recording medium.

22. A data processing program that executes in a data processing device a data processing method by which the data processing device and a recording medium perform mutual authentication, the data processing method permitting transfer of useful data only when the data processing device and the recording medium authenticate each other as being legitimate, the data processing device comprising a medium authentication data storage unit operable to store first medium authentication data, and second medium authentication data generated by applying a predetermined encryption to the first medium authentication data; and a device authentication data storage unit operable to store second device authentication data generated by applying the predetermined encryption to first device authentication data, the data processing program comprising:

a first medium authentication data transmission step of transmitting the first medium authentication data to the recording medium;

a first medium authentication data reception step of receiving third medium authentication data generated by applying a predetermined encryption to the first medium authentication data from the recording medium;

a medium authentication step of judging whether the received third medium authentication data and the stored second medium authentication data are identical, and when the judgement is positive, authenticating the recording medium as being legitimate;

a first device authentication data reception step of receiving the first device authentication data from the recording medium; and a second device authentication data transmission step of, when the first device authentication data reception unit receives the first device authentication data, transmitting the second device authentication data to the recording medium.

23. A computer-readable program recording medium having recorded thereon a data processing program that executes on a computer a data processing method by which a data processing device and a recording medium perform mutual authentication, the data processing method permitting transfer of useful data only when the data processing device and the recording medium authenticate each other as being legitimate, the data processing device comprising a medium authentication data storage unit operable to store first medium authentication data, and second medium authentication data generated by applying a predetermined encryption to the first medium authentication data; and a device authentication data storage unit operable to store second device authentication data generated by applying the predetermined encryption to first device authentication data, the data processing program comprising:

a medium authentication data transmission step of transmitting the first medium authentication data to the recording medium;

an encrypted data reception step of receiving first encrypted data that has been generated by the recording medium by applying an encryption included in the recording medium to the transmitted first medium authentication data;

a medium authentication step of judging whether the received first encrypted data and the stored second medium authentication data are identical, and when the judgement is positive, authenticating the recording medium as being legitimate;

a first device authentication data reception step of receiving the first device authentication data from the recording medium; and a second device authentication data transmission step of, when the first device authentication data reception unit receives the first device authentication data, transmitting the stored second device authentication data to the recording medium.

24. A computer-readable program recording medium having recorded thereon a data processing program that executes on a computer a data processing method by which a data processing device and a recording medium perform mutual authentication, the data processing method permitting transfer of useful data only when the data processing device and the recording medium authenticate each other as being legitimate, the data processing device comprising a medium authentication data storage unit operable to store first medium authentication data, and second medium authentication data generated by applying a predetermined encryption to the first medium authentication data; and a device authentication data storage unit operable to store second device authentication data generated by applying the predetermined encryption to first device authentication data, the data processing program comprising:

a first medium authentication data transmission step of transmitting the first medium authentication data to the recording medium;

a first medium authentication data reception step of receiving third medium authentication data generated by applying a predetermined encryption to the first medium authentication data from the recording medium;

a medium authentication step of judging whether the received third medium authentication data and the stored second medium authentication data are identical, and when the judgement is positive, authenticating the recording medium as being legitimate;

a first device authentication data reception step of receiving the first device authentication data from the recording medium; and a second device authentication data transmission step of, when the first device authentication data reception unit receives the first device authentication data, transmitting the second device authentication data to the recording medium.

25. A recording medium in a data processing system in which a data processing device and the recording medium perform mutual authentication, the data processing system permitting transfer of useful data only when the data processing device and the recording medium authenticate each other as being legitimate, the recording medium comprising:

a medium authentication data reception unit operable to receive first medium authentication data from the data processing device;

a first encryption unit operable to generate first encrypted data by applying encryption included in the recording medium to the received first medium authentication data;

an encrypted data transmission unit operable to transmit the generated first encrypted data to the data processing device;

a device authentication data output unit operable to output first device authentication data;

a first device authentication data transmission unit operable to transmit the output first device authentication data to the data processing device;

a second encryption unit operable to generate second encrypted data by applying the encryption to the output first device authentication data;

a second device authentication data reception unit operable to receive second device authentication data from the data processing device; and a device authentication unit operable to judge whether the received second device authentication data and the generated second encrypted data are identical, and when the judgement is positive, authenticate the data processing device as being legitimate.

26. A recording medium in a data processing system in which a data processing device and the recording medium perform mutual authentication, the data processing system permitting transfer of useful data only when the data processing device and the recording medium authenticate each other as being legitimate, the recording medium comprising:

a second medium authentication data reception unit operable to receive first medium authentication data from the data processing device;

a second medium authentication data storage unit operable to store third medium authentication data;

a second medium authentication data transmission unit operable, when the second medium authentication data reception unit receives the first medium authentication data, to transmit the third medium authentication data to the data processing device;

a second device authentication data storage unit operable to store first device authentication data, and third device authentication data that has been generated by applying the predetermined encryption to the first device authentication data;

a first device authentication data transmission unit operable to transmit the stored first device authentication data to the data processing device;

a second device authentication data reception unit operable to receive second device authentication data from the data processing device; and a device authentication unit operable to judge whether the received second device authentication data and the stored third device authentication data are identical, and when the judgement is positive, authenticate the data processing device as being legitimate.

* * * * *